United States Patent
Yu et al.

(10) Patent No.: US 11,843,119 B2
(45) Date of Patent: Dec. 12, 2023

(54) ELECTRODE ASSEMBLY, BATTERY CELL, BATTERY, AND METHOD AND APPARATUS FOR MANUFACTURING ELECTRODE ASSEMBLY

(71) Applicant: CONTEMPORARY AMPEREX TECHNOLOGY CO., LIMITED, Ningde (CN)

(72) Inventors: Honggang Yu, Ningde (CN); Songjun Shi, Ningde (CN); Haizu Jin, Ningde (CN); Shutao Song, Ningde (CN); Bing Chen, Ningde (CN); Xinxin Du, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/055,623

(22) Filed: Nov. 15, 2022

(65) Prior Publication Data
US 2023/0083594 A1    Mar. 16, 2023

Related U.S. Application Data

(63) Continuation of application No. PCT/CN2020/110628, filed on Aug. 21, 2020.

(51) Int. Cl.
*H01M 4/62*       (2006.01)
*H01M 10/0587*    (2010.01)
*H01M 4/02*       (2006.01)

(52) U.S. Cl.
CPC ....... *H01M 4/628* (2013.01); *H01M 10/0587* (2013.01); *H01M 2004/021* (2013.01)

(58) Field of Classification Search
CPC .......... H01M 10/045; H01M 10/0583; H01M 10/0587; H01M 4/628
See application file for complete search history.

(56) References Cited

U.S. PATENT DOCUMENTS

| | | | |
|---|---|---|---|
| 10,896,785 B2 | 1/2021 | Kano et al. | |
| 2018/0233301 A1 | 8/2018 | Kano et al. | |
| 2019/0386344 A1* | 12/2019 | Kasamatsu | ....... H01M 10/0587 |

FOREIGN PATENT DOCUMENTS

| | | | |
|---|---|---|---|
| CN | 205992575 U | * | 3/2017 |
| CN | 205992575 U |   | 3/2017 |

(Continued)

OTHER PUBLICATIONS

The World Intellectual Property Organization (WIPO) International Search Report and Written Opinion for No. PCT/CN2020/110628, dated May 26, 2021 15 pages (including English translation).

(Continued)

*Primary Examiner* — Stephan J Essex
(74) *Attorney, Agent, or Firm* — ANOVA LAW GROUP, PLLC

(57) ABSTRACT

An electrode assembly includes a positive electrode plate and a negative electrode plate wound or stacked to form a bend region, and a barrier layer provided at the bend region. At least part of the barrier layer is located between the positive electrode plate and the negative electrode plate that are adjacent to each other, and is configured to prevent at least part of ions deintercalated from the positive electrode plate from being intercalated into the negative electrode plate in the bend region.

20 Claims, 12 Drawing Sheets

(56) References Cited

FOREIGN PATENT DOCUMENTS

| | | |
|---|---|---|
| CN | 108417399 A | 8/2018 |
| CN | 208045607 U | 11/2018 |
| CN | 109524606 A | 3/2019 |
| CN | 209071507 U | 7/2019 |
| CN | 209418689 U | 9/2019 |
| CN | 110364769 A | 10/2019 |
| CN | 111554982 A | 8/2020 |
| JP | 2000067907 A | 3/2000 |
| JP | 2003157902 A | 5/2003 |
| JP | 2008041581 A | 2/2008 |
| JP | 2011233408 A | 11/2011 |
| JP | 2018106833 A | 7/2018 |
| JP | 2018129459 A | 8/2018 |
| WO | 2018155248 A1 | 8/2018 |

OTHER PUBLICATIONS

The European Patent Office (EPO) The Extended Search Report for EP Application No. 20949928.3 dated Jul. 6, 2022 6 Pages.
Japan Patent Office (JPO) The Notice of Reasons for Refusal For JP Application No. 2022-522951 dated Aug. 21, 2023 8 Pages (Translation Included).

* cited by examiner

ELECTRODE ASSEMBLY, BATTERY CELL, BATTERY, AND METHOD AND APPARATUS FOR MANUFACTURING ELECTRODE ASSEMBLY

CROSS-REFERENCE TO RELATED APPLICATION

This application is a continuation of International Application No. PCT/CN2020/110628, filed Aug. 21, 2020, the entire content of which is incorporated herein by reference.

TECHNICAL FIELD

This application relates to the field of batteries, and in particular, to an electrode assembly, a battery cell, a battery, and a method and apparatus for manufacturing an electrode assembly.

BACKGROUND

A rechargeable battery may be referred to as a secondary battery, and is a battery that can be charged after being discharged to activate active materials for continuous use. Rechargeable batteries are widely used in electronic devices, such as mobile phones, laptop computers, battery motorcycles, electric vehicles, electric airplanes, electric ships, electric toy cars, electric toy ships, electric toy airplanes, and electric tools.

The rechargeable batteries may include nickel-cadmium batteries, nickel-hydrogen batteries, lithium-ion batteries, secondary alkaline zinc-manganese batteries, and the like.

At present, most commonly used batteries in automobiles are lithium-ion batteries. As rechargeable batteries, the lithium-ion batteries have the advantages of small size, high energy density, high power density, large cycle count, long storage time, and so on.

The rechargeable battery includes an electrode assembly and an electrolyte. The electrode assembly includes a positive electrode plate, a negative electrode plate, and a separator located between the positive electrode plate and the negative electrode plate. The positive electrode plate may also be referred to as a cathode electrode plate, and a positive electrode active material layer is provided on two surfaces of the positive electrode plate. For example, a positive electrode active material of the positive electrode active material layer may be lithium manganate oxide, lithium cobalt oxide, lithium iron phosphate, or lithium nickel cobalt manganate. The negative electrode plate may also be referred to as an anode electrode plate, and a negative electrode active material layer is provided on two surfaces of the negative electrode plate. For example, a negative electrode active material of the negative electrode active material layer may be graphite or silicon.

As a common abnormal phenomenon of lithium batteries, lithium precipitation may affect charging efficiency and energy density of lithium ions. In case of severe lithium precipitation, lithium crystals may be further formed, and the lithium crystals may pierce the separator to cause an internal short circuit and thermal runaway, severely affecting battery safety.

Therefore, how to reduce or avoid lithium precipitation and improve battery safety has become a concern in the industry.

SUMMARY

A plurality of aspects of this application provide an electrode assembly, a battery cell, a battery, and a method and apparatus for manufacturing an electrode assembly, so as to overcome the foregoing problem or at least partially resolve the foregoing problem.

A first aspect of this application provides an electrode assembly, including a positive electrode plate and a negative electrode plate, where the positive electrode plate and the negative electrode plate are wound or stacked to form a bend region.

The bend region is provided with a barrier layer; and at least part of the barrier layer is located between the positive electrode plate and the negative electrode plate that are adjacent to each other, and is used to prevent at least part of ions deintercalated from the positive electrode plate from being intercalated into the negative electrode plate in the bend region. The barrier layer is provided between the positive electrode plate and the negative electrode plate that are adjacent to each other, so that the barrier layer blocks at least part of ions deintercalated from a positive electrode active material layer of the positive electrode plate in the bend region during charging, and the ions blocked by the barrier layer cannot be intercalated into a negative electrode active material layer of the negative electrode plate adjacent to the positive electrode plate in the bend region. In this way, in a case that the negative electrode active material layer of the negative electrode plate falls off, lithium precipitation is reduced, thereby improving safety performance of battery cells and improving service life of the battery cells.

In some embodiments, the electrode assembly further includes a separator for isolating the positive electrode plate and the negative electrode plate that are adjacent to each other; and the barrier layer is attached to one or two surfaces of the positive electrode plate, and/or the barrier layer is attached to one or two surfaces of the negative electrode plate, and/or the barrier layer is attached to one or two surfaces of the separator. This can reduce positional movement of the barrier layer during use of the electrode assembly.

In some embodiments, the electrode assembly further includes a separator for isolating the positive electrode plate and the negative electrode plate that are adjacent to each other; and the barrier layer is independently provided between the positive electrode plate and the separator that are adjacent to each other in the bend region, or the barrier layer is independently provided between the negative electrode plate and the separator that are adjacent to each other in the bend region. This facilitates installation of the barrier layer.

In some embodiments, a porosity of the barrier layer is less than a porosity of the separator. In this way, the barrier layer can more effectively block passage of lithium ions.

In some embodiments, the electrode assembly includes one positive electrode plate and one negative electrode plate; the one positive electrode plate and the one negative electrode plate are compacted and wound to form one winding structure; and the barrier layer is provided between the positive electrode plate and the negative electrode plate that are adjacent to each other on at least an innermost side of the bend region. In this way, lithium precipitation between the positive electrode plate and the negative electrode plate that are adjacent to each other on the innermost side can be reduced, improving safety performance.

In some embodiments, an innermost electrode plate in the bend region is a negative electrode plate. This can improve utilization efficiency of an active material of the positive electrode plate.

In some embodiments, there are a plurality of discontinuous barrier layers; and the plurality of discontinuous barrier layers are spaced apart from each other in a bending direction or the plurality of discontinuous barrier layers are spaced apart from each other in a direction perpendicular to the bending direction. In this way, passage of some lithium ions can be blocked, reducing lithium precipitation and also ensuring energy density of the electrode assembly.

In some embodiments, a thickness of the barrier layer is 2 to 200 microns, or 5 to 100 microns. This can ensure safety of the electrode assembly and also ensure energy density of the electrode assembly.

In some embodiments, the barrier layer is provided with at least one through hole.

In some embodiments, the porosity of the barrier layer is 10% to 70%, or 20% to 60%. This can ensure safety of the electrode assembly and also ensure energy density of the electrode assembly.

In some embodiments, the thickness of the barrier layer is A microns, the porosity of the barrier layer is B, and A and B satisfy the following relationship: 3.5 microns≤A/B≤2000 microns; or 7 microns≤A/B≤1000 microns. This can ensure safety of the electrode assembly and also ensure energy density of the electrode assembly.

In some embodiments, two ends, in a direction perpendicular to the bending direction, of the negative electrode active material layer of the negative electrode plate extends beyond corresponding ends of the positive electrode active material layer of the positive electrode plate. This can ensure energy density of the electrode assembly.

In some embodiments, the barrier layer includes two ends in a direction perpendicular to the bending direction, and one or two ends of the barrier layer extend beyond the positive electrode active material layer of the positive electrode plate. In this way, passage of more lithium ions can be blocked, reducing lithium precipitation.

In some embodiments, the barrier layer includes two ends in a direction perpendicular to the bending direction, and the negative electrode active material layer of the negative electrode plate extends beyond one or two ends of the barrier layer. In this way, passage of some lithium ions can be blocked, reducing lithium precipitation and also ensuring energy density of the electrode assembly.

In some embodiments, the barrier layer is disposed opposite a largest-curvature portion of the negative electrode plate. In this way, no lithium ions may be intercalated into the largest-curvature portion or only a small part of lithium ions are intercalated into the largest-curvature portion, thereby reducing lithium precipitation.

In some embodiments, the barrier layer includes at least one of the following: inorganic oxide, binder, or adhesive tape.

In some embodiments, two ends, extending in the bending direction, of the barrier layer are located in the bend region. In this way, passage of more lithium ions can be blocked, reducing lithium precipitation.

In some embodiments, the electrode assembly is provided with a flat region connected to the bend region.

One end, extending in the bending direction, of the barrier layer is located in the flat region, and the other end is located in the bend region; or two ends, extending in the bending direction, of the barrier layer are both located in the flat region.

A second aspect of this application provides a battery cell, including: a housing, a cover plate, and at least one electrode assembly according to at least one of the foregoing embodiments.

The housing is provided with an accommodating cavity and an opening, and the electrode assembly is accommodated in the accommodating cavity; and
the cover plate is configured to close the opening of the housing.

A third aspect of this application provides a battery, including a box body and at least one battery cell, and the battery cell is received in the box body.

A fourth aspect of this application provides a method for manufacturing an electrode assembly, including:
providing a positive electrode plate, a negative electrode plate, and a barrier layer; and
winding or stacking the positive electrode plate and the negative electrode plate to form a bend region, where the bend region is provided with the barrier layer, and at least part of the barrier layer is located between the positive electrode plate and the negative electrode plate that are adjacent to each other, and is used to prevent at least part of ions deintercalated from the positive electrode plate from being intercalated into the negative electrode plate in the bend region.

In some embodiments, a separator for isolating the positive electrode plate and the negative electrode plate that are adjacent to each other is provided; and the separator, the positive electrode plate, and the negative electrode plate are wound or stacked together.

In some embodiments, before the separator, the positive electrode plate, and the negative electrode plate are wound or stacked together, the method further includes: placing the barrier layer on one or two surfaces of the positive electrode plate or the negative electrode plate.

In some embodiments, the placing the barrier layer on one or two surfaces of the positive electrode plate or the negative electrode plate specifically includes: adhering or coating the barrier layer to one or two surfaces of the positive electrode plate or the negative electrode plate.

A fifth aspect of this application provides a device for manufacturing an electrode assembly, including:
a first providing apparatus, configured to provide a positive electrode plate;
a second providing apparatus, configured to provide a negative electrode plate;
a third providing apparatus, configured to provide a barrier layer; and
an assembly apparatus, configured to wind or stack the positive electrode plate and the negative electrode plate to form a bend region.

The bend region is provided with a barrier layer; and at least part of the barrier layer is located between the positive electrode plate and the negative electrode plate that are adjacent to each other, and is used to prevent at least part of ions deintercalated from the positive electrode plate from being intercalated into the negative electrode plate in the bend region.

In some embodiments, the device for manufacturing an electrode assembly further includes a fourth providing apparatus, configured to provide a separator for isolating the positive electrode plate and the negative electrode plate that are adjacent to each other, where the assembly apparatus is further configured to wind or stack the positive electrode plate, the negative electrode plate, and the separator to form the bend region.

In some embodiments, there are two third providing apparatuses, and the two third providing apparatuses each are configured to provide the barrier layer and adhere or coat the barrier layer to two surfaces of the positive electrode plate or the negative electrode plate.

A sixth aspect of this application provides an electric apparatus, where the electric apparatus is configured to receive power supplied by a battery.

The foregoing description is merely an overview of the technical solutions in the embodiments of this application. In order to better understand the technical means in the embodiments of this application, to achieve implementation according to content of the specification, and to make the above and other objects, features and advantages in the embodiments of this application more comprehensible to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DETAILED DESCRIPTION OF EMBODIMENTS

Figure 1:
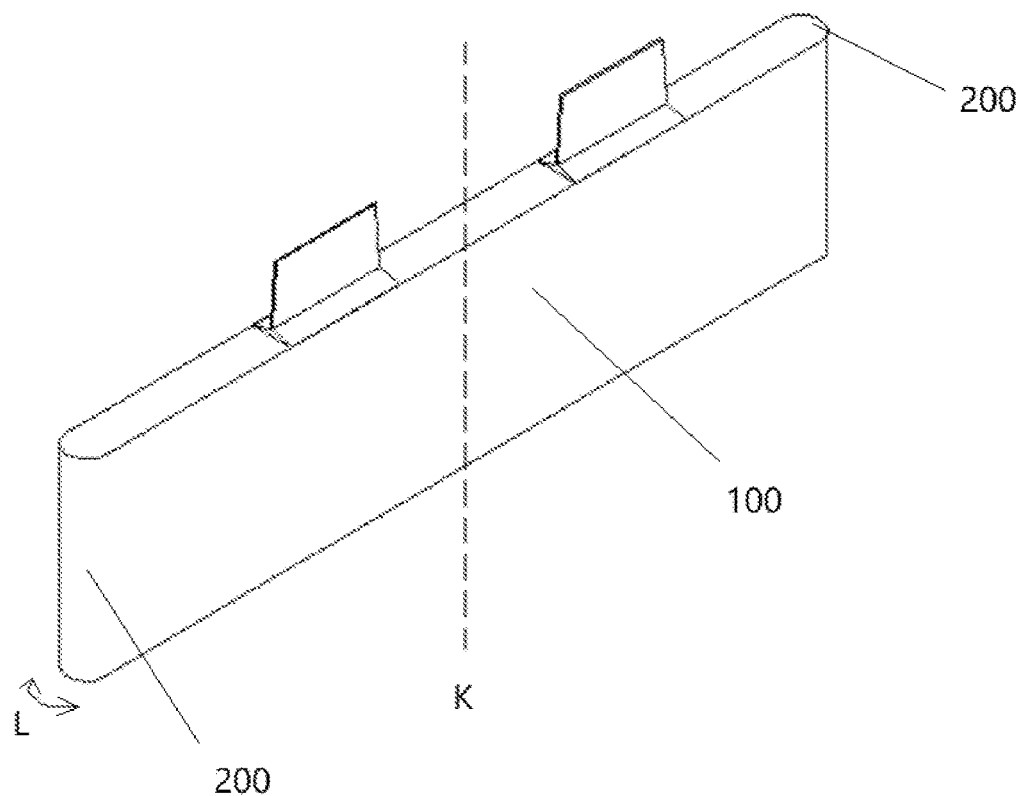
FIG. 1 is a schematic three-dimensional structural diagram of an electrode assembly according to an embodiment of this application.

To make the objectives, technical solutions, and advantages of the embodiments of this application clearer, the following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Unless otherwise defined, all technical and scientific terms used herein shall have the same meanings as commonly understood by those skilled in the art to which this application belongs. The terms used in the specification of this application are merely intended to describe the specific embodiments but not intended to constitute any limitation on this application. The terms "include", "have" and any other variants in the specification, claims, and description of accompanying drawings of this application mean to cover the non-exclusive inclusion.

The term "embodiment" described herein means that specific features, structures, or characteristics in combination with descriptions of the embodiments may be incorporated in at least one embodiment of this application. The word "embodiment" in various positions in the specification does not necessarily refer to a same embodiment, or an independent or alternative embodiment that is exclusive of other embodiments. Persons skilled in the art explicitly and implicitly understand that the embodiments described herein may combine with another embodiments.

The term "and/or" in this specification describes only an association relationship for describing associated objects and represents that three relationships may exist. For example, A and/or B may represent the following three cases: A alone, both A and B, and B alone. In addition, the character "/" in this specification generally indicates an "or" relationship between the associated objects.

In the descriptions of this application, it should be understood that the orientations or positional relationships indicated by the terms "center", "vertical", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships shown in the accompanying drawings, are merely intended to facilitate the descriptions of this application and simplify the descriptions, are not intended to indicate or imply that the apparatuses or components mentioned in this application must have specific orientations, or be constructed and operated for a specific orientation, and therefore shall not be construed as a limitation to this application. In addition, the terms "first", "second" and the like in the specification, claims or description of accompanying drawings of this application are used to distinguish between different objects but not describe a specific sequence, and can explicitly or implicitly include one or more features. In the descriptions of this application, unless otherwise specified, "plurality" means two or more than two.

In the descriptions of this application, it should be noted that unless otherwise specified and defined explicitly, the terms "install", "link", and "connection" should be understood in their general senses. For example, the terms may be a fixed connection, a detachable connection, or an integrated connection; or may be a mechanical connection or an electrical connection; or may be a direct connection, or an indirect connection through an intermediate medium; or may be an internal connection between two components. A person of ordinary skill in the art can understand specific meanings of these terms in this application based on specific situations.

In order to make a lithium-ion battery smaller in volume and higher in energy density, a positive electrode plate, a negative electrode plate, and a separator in an electrode assembly of the lithium-ion battery may be wound and then compacted. For example, FIG. 1 is a schematic three-dimensional structural diagram of an electrode assembly. The electrode assembly includes a negative electrode plate, a positive electrode plate, and a separator. The negative electrode plate, the positive electrode plate, and the separator are stacked and wound around a winding axis K to form a winding structure. The separator is an insulation film and used to isolate the negative electrode plate from the positive electrode plate to prevent short circuit of the negative electrode plate and the positive electrode plate. The winding structure of the electrode assembly is of a flat shape. A schematic structural diagram of a cross section of the electrode assembly in a direction perpendicular to the winding axis K may be shown in FIG. 2.

Figure 2:
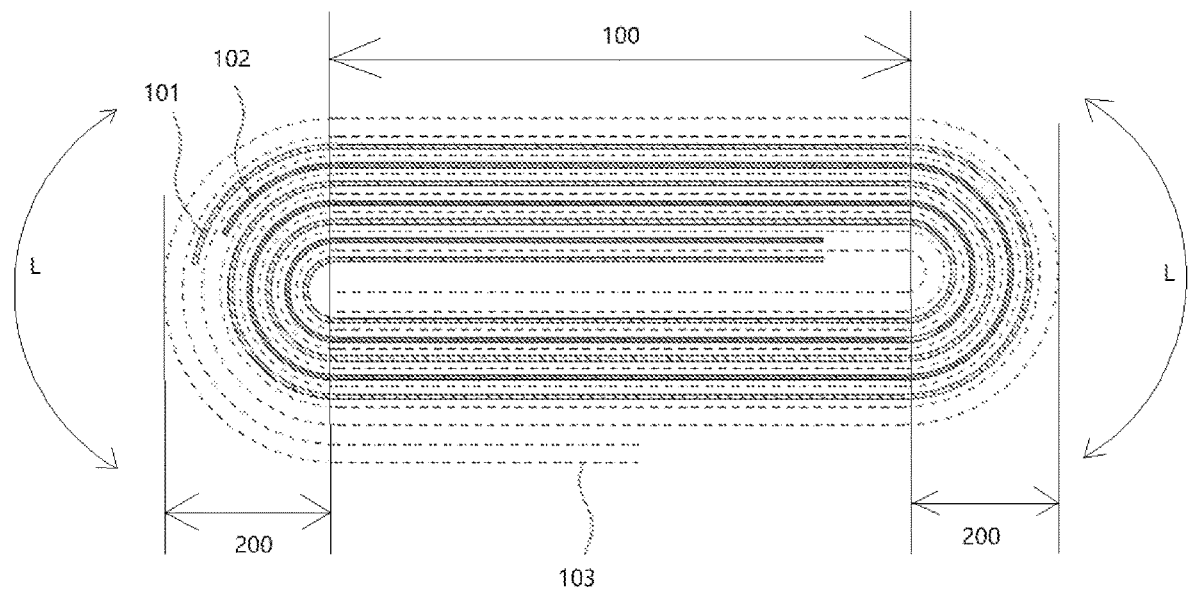
FIG. 2 is a schematic structural diagram of a cross section of the electrode assembly of FIG. 1 in a direction perpendicular to a winding axis K.

With reference to FIG. 1 and FIG. 2, the electrode assembly includes a flat region 100 and bend regions 200 located at two ends of the flat region 100. The flat region 100 is a region with a parallel structure in the winding structure, that is, the negative electrode plate 101, the positive electrode plate 102, and the separator 103 in the flat region 100 are substantially parallel to each other. In other words, surfaces of the negative electrode plate 101, the positive electrode plate 102, and the separator 103 in the flat region 100 of the electrode assembly are all flat. The bend region 200 is a region with a bending structure in the winding structure, that is, the negative electrode plate 101, the positive electrode plate 102, and the separator 103 in the bend region 200 are all bent. In other words, surfaces of the negative electrode plate 101, the positive electrode plate 102, and the separator 103 in the bend region 200 of the electrode assembly are all curved. The bend region 200 has a bending direction L, and the bending direction L can be understood as a direction in which surfaces of the electrode assembly in the bend region points to the flat region. For example, the bending direction L is a winding direction of the winding structure in the bend region 200.

A surface of the negative electrode plate 101 has a negative electrode active material layer composed of a negative electrode active material, and a surface of the positive electrode plate 102 has a positive electrode active material layer composed of a positive electrode active material. For example, the positive electrode active material may be lithium manganate oxide, lithium cobalt oxide, lithium iron phosphate, or lithium nickel cobalt manganate, and the negative electrode active material may be graphite or silicon.

During charging of the lithium-ion battery, lithium ions are deintercalated from the positive electrode and intercalated into the negative electrode. However, some exceptions may occur, for example, insufficient space for lithium intercalation in the negative electrode, excessively large resistance for intercalation of lithium ions into the negative electrode, excessively rapid deintercalation of lithium ions from the positive electrode, inability of intercalating deintercalated lithium ions into the negative electrode active material layer of the negative electrode plate in the same amount, or lithium ions that cannot be intercalated into the negative electrode plate obtaining electrons only on the surface of the negative electrode. Consequently, a silver-white metallic lithium element is formed, which is referred to as lithium precipitation. Lithium precipitation not only reduces performance of lithium-ion batteries and greatly shortens the cycle life, but also limits a fast charging capacity of the lithium-ion batteries. In addition, when lithium precipitation occurs in the lithium-ion battery, resulting lithium metal is so active to react with the electrolyte at a lower temperature, causing a lower self-heating start temperature (Tonset) and a higher self-heating rate, and therefore severely affecting battery safety. Furthermore, in case of severe lithium precipitation, deintercalated lithium ions may form lithium crystals on the surface of the negative electrode plate, and the lithium crystals are prone to pierce the separator, to cause a risk of short circuit to the positive electrode plate and the negative electrode plate that are adjacent to each other.

During the research and development process, the inventor found that lithium precipitation often occurs in the bend region of the electrode assembly. Through further research, the inventor found that lithium precipitation is attributed to falling-off of the active material. The positive active material is coated on the surface of the positive electrode plate, and the negative active material is coated on the surface of the negative electrode plate; however, the positive electrode plate and the negative electrode plate that are located in the bend region need to be bent, and therefore the active materials may fall off, which is referred to as powder falling-off. This especially occurs on an innermost-layer electrode plate in the bend region due to a largest bending degree of the innermost-layer electrode plate that easily causes falling-off of the active material. Due to falling-off of the active materials, especially falling-off of the active material on the negative electrode plate, lithium intercalation positions on the negative electrode active material layer of the negative electrode plate may be less than lithium ions that can be provided by the positive electrode active material layer of the positive electrode plate adjacent to the negative electrode plate. As a result, the lithium battery is prone to lithium precipitation during charging.

In view of this, this application is intended to provide an electrode assembly. The electrode assembly includes a negative electrode plate, a positive electrode plate, and a separator. The negative electrode plate, the positive electrode plate, and the separator may be stacked and wound in a winding axis to form a winding structure, for example, a flat-shaped winding structure. The negative electrode plate, the positive electrode plate, and the separator may be continuously folded in a zigzag manner after being stacked. Regardless of whether the electrode assembly is formed in a winding or zigzag manner, the electrode assembly includes a flat region and bend regions connecting two ends of the flat region. In order to reduce or avoid lithium precipitation, a barrier layer is provided between any positive electrode plate and negative electrode plate that are adjacent to each other in the bend region. The barrier layer is especially provided between the positive electrode plate and negative electrode plate that are adjacent to each other on an innermost side of the bend region. The barrier layer is used to block at least part of lithium ions deintercalated from the positive electrode active material layer of the positive electrode plate in the bend region, so that the ions blocked by the barrier layer cannot be intercalated into the negative electrode active material layer of the negative electrode adjacent to the positive electrode plate in the bend region. In this way, a quantity of lithium intercalation positions on the negative electrode active material layer of the negative electrode plate in the bend region is substantially the same as a quantity of lithium ions that can be provided by the positive electrode active material layer of the positive electrode plate adjacent to the negative electrode plate, thereby reducing or avoiding lithium precipitation.

Figure 3:
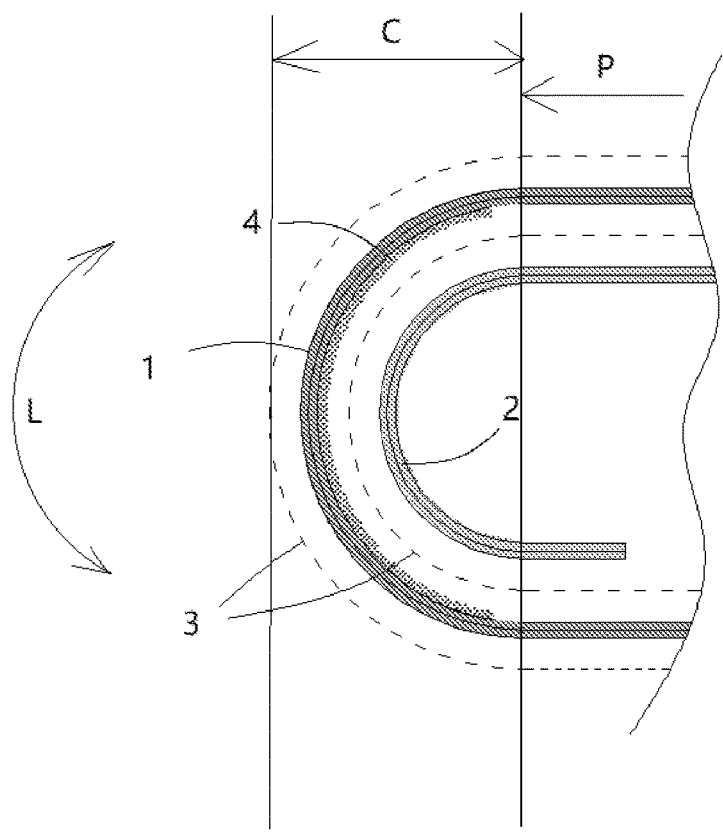
FIG. 3 is a schematic partial structural diagram of a bend region of an electrode assembly according to an embodiment of this application.

Regardless of whether the electrode assembly is formed in the winding or zigzag manner, the electrode assembly includes the flat region and the bend regions connecting two ends of the flat region. For ease of description, the electrode assembly in this embodiment is described by using the flat-shaped winding structure as an example. For example, one bend region C and a flat region P of the flat-shaped winding structure may be shown in FIG. 3. FIG. 3 is a schematic partial structural diagram of a bend region of an electrode assembly according to an embodiment of this application. In the bend region C, the electrode assembly includes a positive electrode plate 1, a negative electrode plate 2, and a separator 3 for isolating the positive electrode plate 1 and the negative electrode plate 2. The separator 3 may be independently provided between the positive electrode plate 1 and the negative electrode plate 2 that are adjacent to each other, or may be coated to a surface of the positive electrode plate 1 or the negative electrode plate 2.

The separator 3 features electronic insulation and is used to isolate the positive electrode plate 1 and the negative electrode plate 2 that are adjacent to each other, so as to prevent a short circuit of the positive electrode plate 1 and the negative electrode plate 2 that are adjacent to each other. The separator 3 is provided with a large number of through micropores to ensure free passage of electrolyte ions and good permeability of lithium ions. Therefore, the separator 3 basically cannot block passage of the lithium ions. For example, the separator 3 includes a separator substrate and a functional layer located on a surface of the separator substrate. The separator substrate may be at least one of polypropylene, polyethylene, ethylene-propylene copolymer, polybutylene terephthalate, or the like. The functional layer may be a mixture layer of ceramic oxide and a binder.

For the electrode assembly in this embodiment of this application, the bend region C is further provided with a barrier layer 4; and at least part of the barrier layer 4 is located between the positive electrode plate 1 and the negative electrode plate 2 that are adjacent to each other, and is used to prevent at least part of ions deintercalated from the positive electrode plate 1 from being intercalated into the negative electrode plate 2 in the bend region C.

Disposing the barrier layer 4 between the positive electrode plate 1 and the negative electrode plate 2 that are adjacent to each other in the bend region C can effectively reduce or avoid lithium precipitation. The barrier layer 4 is provided between the positive electrode plate 1 and the negative electrode plate 2 that are adjacent to each other, so that the barrier layer 4 blocks at least part of ions deintercalated from a positive electrode active material layer (for example, a positive electrode active material layer in the bend region C) of the positive electrode plate 1 during charging, and the ions blocked by the barrier layer 4 cannot be intercalated into a negative electrode active material layer of the negative electrode plate 2 in the bend region C. In this way, when the negative electrode active material layer of the negative electrode plate 2 falls off, lithium precipitation is reduced. That is, although the number of lithium intercalation positions on the negative electrode plate 2 is reduced due to falling-off of the negative electrode active material, lithium precipitation can be reduced or even avoided because the barrier layer 4 blocks at least part of the lithium ions deintercalated from the positive electrode plate 1 adjacent to the negative electrode plate 2.

In another embodiment of this application, in order to block passage of lithium ions, the barrier layer 4 may be made of inorganic oxide and/or macromolecular polymer.

In another embodiment of this application, the inorganic oxide may be at least one of magnesium oxide (MgO), calcium oxide (CaO), boehmite, wollastonite, barium sulfate (BaSO4), calcium sulfate (CaSO4), calcium carbonate (CaCO3), aluminum oxide (Al2O3), or silicon dioxide (SiO2).

In another embodiment of this application, the macromolecular polymer may be polypropylene (polypropylene), polyvinyl chloride (PVC), polyethylene (polyethylene, PE), epoxy resin, polyacrylate, and polyurethane rubber.

In another embodiment of this application, the barrier layer 4 may be adhesive tape or adhesive paper. The adhesive tape includes an adhesive and a substrate. The substrate may be made of polyethylene and/or ethylene-vinyl acetate copolymer (EVA), or the like. The adhesive paper is made of at least one of polyethylene phthalate, polyvinylidene fluoride, polyurethane, sodium polyacrylate, styrene butadiene rubber, polyetherimide, carboxymethyl cellulose, or acrylate.

In another embodiment of this application, one positive electrode plate 1 and one negative electrode plate 2 may be stacked and then wound or folded, or at least one (for example, two or more) positive electrode plate 1 and at least one (for example, two or more) negative electrode plate 2 are stacked and then wound or folded, to form a bend region C. When the electrode assembly is provided with a plurality of positive electrode plates 1 and a plurality of negative electrode plate 2 in the bend region C, the bend region C includes a structure in which positive electrode plates 1 and negative electrode plates 2 are alternately arranged, and the barrier layer 4 is included between at least one positive electrode plate 1 and at least one negative electrode plate 2 that are adjacent to each other. The positive electrode plate 1 and the negative electrode plate 2 that are adjacent to each other in the bend region C indicate that one positive electrode plate 1 and one negative electrode plate 2 are adjacent in the bend region C, without another one positive electrode plate 1 or another one negative electrode plate 2 included in between.

In another embodiment of this application, in addition to the structure in which the positive electrode plate 1 and the negative electrode plate 2 are alternately arranged, the bend region C (for example, the innermost and/or outermost side of the bend region C) may alternatively have a structure in which no negative electrode plate 2 is sandwiched between two adjacent positive electrode plates 1, or a structure in which no positive electrode plate 1 is sandwiched between two adjacent negative electrode plates 2. In this case, no barrier layer 4 may be provided between two positive electrode plates 1 or two adjacent negative electrode plates 2, that is, the barrier layer 4 is provided between the positive electrode plate 1 and the negative electrode plate 2 that are adjacent to each other.

In another embodiment of this application, the innermost electrode plate in the bend region C of the electrode assembly is generally most bent, that is, the active material of the innermost electrode plate has a largest probability of falling-off or the active material falls off most severely. The innermost electrode plate may be a positive electrode plate 1 or a negative electrode plate 2. For example, when the innermost electrode plate is the negative electrode plate 2, in order to reduce lithium precipitation to a maximum extent, the barrier layer 4 is disposed between the positive electrode plate 1 and the negative electrode plate 2 that are adjacent to each other on at least the innermost side of the bend region C. In this way, lithium precipitation between the positive electrode plate and the negative electrode plate that are adjacent to each other on the innermost side can be reduced, improving safety performance. When the innermost electrode plate in the bend region C is the negative electrode plate 2, utilization efficiency of the active material of the positive electrode plate 1 can be improved.

The barrier layer 4 is located between the positive electrode plate 1 and the negative electrode plate 2 that are adjacent to each other. The barrier layer 4 may be independently located between the positive electrode plate 1 and the negative electrode plate 2 that are adjacent to each other, or the barrier layer 4 may be attached to any surface of the positive electrode plate 1, the negative electrode plate 2, or the separator 3. That the barrier layer 4 may be independently located between the positive electrode plate 1 and the negative electrode plate 2 that are adjacent to each other means that the barrier layer 4 is stacked with each of the positive electrode plate 1 and the negative electrode plate 2 in a separated manner, not being in an adhering or coating relationship. This facilitates installation of the barrier layer 4. Attaching means adhering, coating, or spraying. By means of attaching, positional movement of the barrier layer 4 can be reduced during use of the battery cell.

For example, the barrier layer 4 is attached to one or two surfaces of the positive electrode plate 1, and/or the barrier layer 4 is attached to one or two surfaces of the negative electrode plate 2.

In another embodiment of this application, the barrier layer 4 is independently located between the positive electrode plate 1 and the separator 3 that are adjacent to each other in the bend region C, or the barrier layer 4 is independently located between the negative electrode plate 2 and the separator 3 that are adjacent to each other in the bend region C, or the barrier layer 4 is attached to one or two surfaces of the separator 3. That the barrier layer 4 is independently located between the positive electrode plate 1 and the separator 3 that are adjacent to each other in the bend region C, or the barrier layer 4 is independently located between the negative electrode plate 2 and the separator 3 that are adjacent to each other in the bend region C indicates that the barrier layer 4 is separately stacked with the positive electrode plate 1, the negative electrode plate 2, and the separator 3, not being in an adhering or coating relationship.

In another embodiment of this application, two ends, extending in the bending direction L, of the barrier layer 4 are both located in the bend region C, that is, the barrier layer 4 is completely located in the bend region C. In this embodiment, the electrode assembly further includes a flat region P connected to the bend region C. The bending direction L is a direction along a curved surface of the bend region C and pointing to the flat region P, and a direction perpendicular to the bending direction L is a direction vertical with the bending direction L.

In another embodiment of this application, one end, extending in the bending direction L, of the barrier layer 4 is located in the flat region P, and the other end is located in the bend region C.

In another embodiment of this application, in order to block as many lithium ions as possible, the barrier layer 4 has a large area as possible in the bend region C. For example, two ends, extending in the bending direction L, of the barrier layer 4 are both located in the flat region P, that is, the barrier layer 4 is not only located in the bend region C but also extends to the flat region P.

In another embodiment of this application, two ends, extending in the bending direction L, of the barrier layer 4 are both located at a junction between the bend region C and the flat region P, or two ends, extending in the bending direction L, of the barrier layer 4 are both close to a junction between the bend region C and the flat region P.

In another embodiment of this application, for the positive electrode plate 1 and the negative electrode plate 2 that are adjacent to each other, when the negative electrode plate 2 is located on the innermost side of the bend region C, falling-off of the active material is most severe in a largest-curvature portion of the innermost negative electrode plate 2. Therefore, regardless of how the barrier layer 4 extends in the bending direction L, the barrier layer 4 prevents, as many as possible, lithium ions deintercalated from the positive electrode plate 1 from being intercalated into the largest-curvature portion of the negative electrode plate 2, that is, the barrier layer 4 is provided opposite to the largest-curvature portion of the negative electrode plate 2, so as to cover the largest-curvature portion of the negative electrode plate 2. In this way, no lithium ions may be intercalated into the largest-curvature portion of the negative electrode plate 2 or only a small number of lithium ions are intercalated into the largest-curvature portion of the negative electrode plate 2, thereby reducing lithium precipitation.

In another embodiment of this application, the largest-curvature portion of the negative electrode plate 2 on the innermost side of the bend region C is a line (for example, the line may be a straight line) perpendicular to the bending direction L on a curved surface of the negative electrode plate 2 on the innermost side of the bend region C. A curvature of any point on the line is greater than a curvature of a curved surface, on both sides extending from the point in the bending direction L, of the negative electrode plate 2 on the innermost side of the bend region C. For example, when the negative electrode plate 2 is symmetrically bent in the bending direction L in the bend region C, the largest-curvature portion of the negative electrode plate 2 on the innermost side of the bend region C is a middle portion of the negative electrode plate 2 in the bend region C.

A larger area of the barrier layer 4 in the bend region C indicates that more lithium ions can be blocked. However, more lithium ions blocked indicates lower energy density of the bend region C, resulting in lower energy density of the electrode assembly. Therefore, in another embodiment of this application, for the positive electrode plate 1 and the negative electrode plate 2 that are adjacent to each other in the bend region C, an appropriate amount of lithium ions can be deintercalated from the positive electrode plate 1 and intercalated into the negative electrode plate 2, ensuring energy density to some extent.

Figure 4:
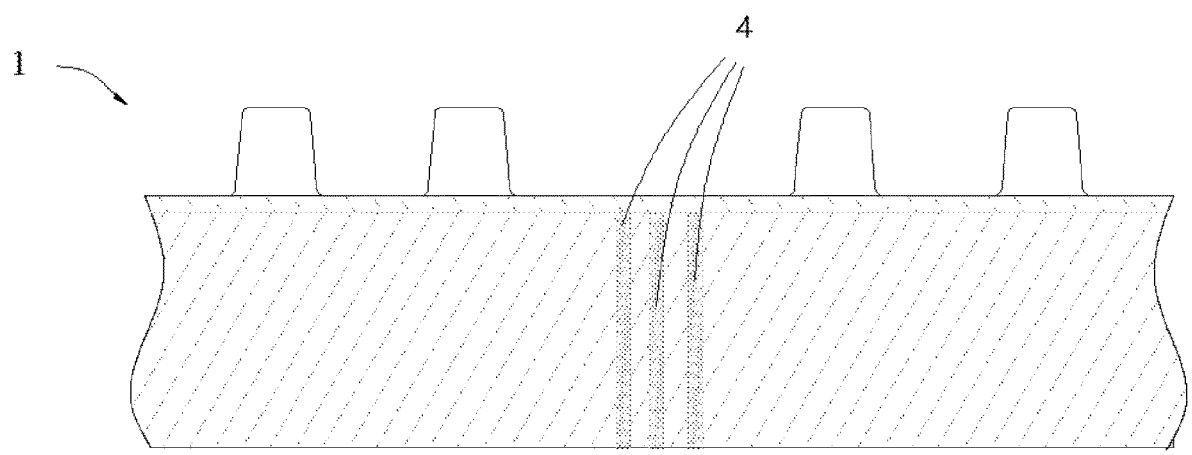
FIG. 4 is a schematic structural diagram showing distribution of barrier layers after a bend region of an electrode assembly is flattened according to another embodiment of this application.

For example, as shown in FIG. 4, FIG. 4 is a schematic structural diagram showing distribution of barrier layers after a bend region of an electrode assembly is flattened according to another embodiment of this application. A plurality of discontinuous barrier layers 4 are included between the positive electrode plate 1 and the negative electrode plate 2 that are adjacent to each other in the bend region C. The plurality of discontinuous barrier layers are spaced apart from each other in the bending direction L, so that part of lithium ions are not blocked by the barrier layer 4, that is, the part of lithium ions pass between two adjacent barrier layers 4 and are intercalated into the negative electrode active material layer of the negative electrode plate 2. For example, the plurality of discontinuous barrier layers 4 are attached to the surface of the positive electrode plate 1. In this way, passage of some lithium ions can be blocked, reducing lithium precipitation and also ensuring energy density of the electrode assembly.

Figure 5:
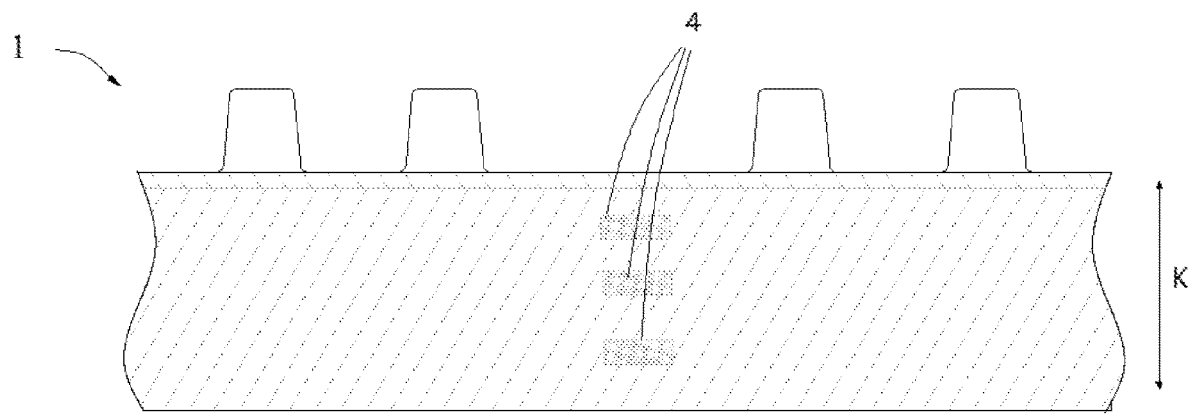
FIG. 5 is a schematic structural diagram showing another type of distribution of barrier layers after a bend region of an electrode assembly is flattened according to another embodiment of this application.

For another example, as shown in FIG. 5, FIG. 5 is a schematic structural diagram showing another type of distribution of barrier layers after a bend region of an electrode assembly is flattened according to another embodiment of this application. A plurality of discontinuous barrier layers 4 are included between the positive electrode plate 1 and the negative electrode plate 2 that are adjacent to each other in the bend region. The plurality of discontinuous barrier layers 4 are spaced apart from each other in a direction K perpendicular to the bending direction L, so that part of lithium ions are not blocked by the barrier layer 4, that is, the part of lithium ions pass between two adjacent barrier layers 4 and are intercalated into the negative electrode active material layer of the negative electrode plate 2. For example, the plurality of discontinuous barrier layers 4 are attached to the surface of the positive electrode plate 1. The direction K perpendicular to the bending direction L may be a width direction of the positive electrode plate 1 and the negative electrode plate 2. When the electrode assembly is a winding structure, the direction K perpendicular to the bending direction L is a winding axis direction of the winding structure.

Figure 6:
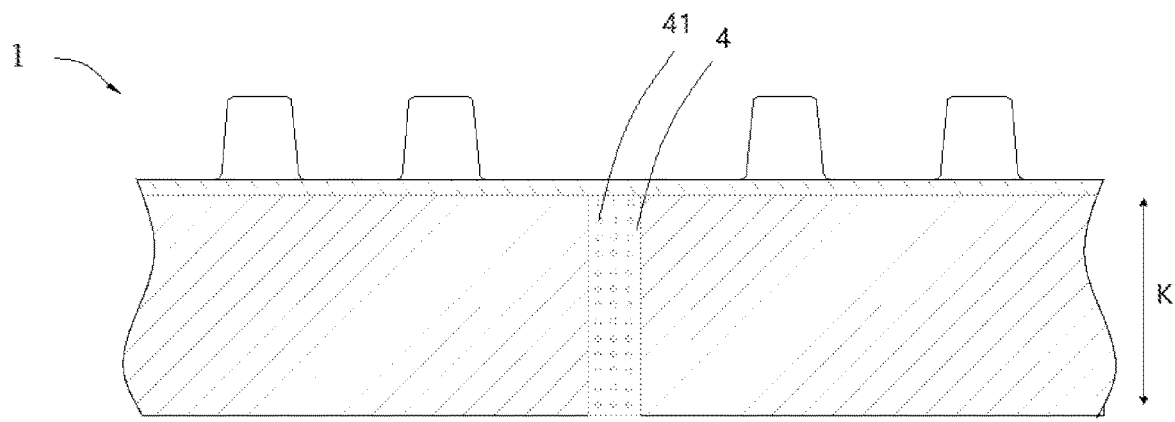
FIG. 6 is a schematic structural diagram showing another type of distribution of barrier layers after a bend region of an electrode assembly is flattened according to another embodiment of this application.

For still another example, as shown in FIG. 6, FIG. 6 is a schematic structural diagram showing another type of distribution of barrier layers after a bend region of an electrode assembly is flattened according to another embodiment of this application. The barrier layer 4 is attached to the surface of the positive electrode plate 1. The barrier layer 4 is provided with at least one through hole 41, configured to allow part of lithium ions to pass through and be intercalated into the negative electrode active material layer of the negative electrode plate 2.

In another embodiment of this application, the porosity of the barrier layer 4 is less than the porosity of the separator 3, so that the barrier layer 4 can more effectively block passage of lithium ions. The porosity is a percentage of a pore volume of bulk material in a total volume of the material in a natural state. Generally, a test method for porosity is a test method for true density.

In order to achieve a good balance between blocking lithium ions and maintaining energy density, the thickness of the barrier layer 4 is A micron, and the porosity of the barrier layer 4 is B, where A and B satisfy the following relationship: 3.5 microns≤A/B≤2000 microns, optionally, 7 microns≤A/B≤1000 microns. This can ensure both safety of the electrode assembly and energy density of the electrode assembly, achieving a better balance between safety performance and energy density. A being excessively small indicates that the thickness of the barrier layer 4 is excessively small, and lithium crystals are prone to pierce the barrier layer 4 or even pierce the separator 3, so that the barrier layer 4 is unable to block lithium ions, possibly leading to a safety risk. B being excessively large indicates that the porosity of the barrier layer 4 is excessively large. A larger porosity of the barrier layer 4 indicates that more lithium ions pass through the barrier layer 4, possibly resulting in severe lithium precipitation. For example, A/B being less than 3.5 indicates that A is relatively small, that is, the thickness of the barrier layer 4 is excessively small and B is relatively large. In other words, the porosity of the barrier layer 4 is excessively large, and the barrier layer 4 loses the function of blocking lithium ions, possibly leading to a safety risk. A/B being greater than 2000 indicates that A is relatively large, that is, the thickness of the barrier layer 4 is excessively large and B is relatively small. In other words, the porosity of the barrier layer 4 is excessively small, which severely affects energy density of the battery cell.

For example, the thickness of the barrier layer 4 is 2 to 200 microns (um); optionally, the thickness of the barrier layer 4 is 5 to 100 microns; further optionally, the thickness of the barrier layer 4 is 5 to 50 microns. This can ensure both safety of the electrode assembly and energy density of the electrode assembly, achieving a better balance between safety performance and energy density. For example, the thickness of the barrier layer 4 being less than 2 um indicates that the thickness of the barrier layer 4 is excessively small. In case of severe lithium precipitation, lithium crystals pierce the barrier layer 4 and even pierce the separator 3, and consequently the barrier layer 4 is unable to block lithium ions, leading to a safety risk. The thickness of the barrier layer 4 being greater than 500 um indicates that the thickness of the barrier layer 4 is excessively large, leading to an excessively large gap between the positive electrode plate 1 and the negative electrode plate 2 that are adjacent to each other. The barrier layer 4 occupies space, which may affect the energy density of the electrode assembly. In addition, an excessively large gap between two adjacent layers may severely affect cycle performance.

The porosity of the barrier layer 4 is 10% to 70%; optionally, the porosity of the barrier layer 4 is 20% to 60%. This can ensure both safety of the electrode assembly and energy density of the electrode assembly, achieving a better balance between safety performance and energy density. For example, when the porosity is less than 10%, most or all of the lithium ions may be blocked by the barrier layer 4, and cannot be intercalated into the negative electrode plate 2, thereby affecting the energy density of the electrode assembly. However, when the porosity is greater than 70%, most or almost all of the lithium ions may pass through the barrier layer 4, leading to a risk of lithium precipitation. As a result, lithium crystals may pierce the barrier layer 4, and the barrier layer 4 is unable to block lithium ions, leading to a safety risk.

When the electrode assembly is of a winding structure, the width direction of the positive electrode plate 1 and the negative electrode plate 2 is parallel to the winding axis direction, and the width direction of the positive electrode plate 1 and the negative electrode plate 2 is perpendicular to the bending direction L. When the electrode assembly is not of a winding structure, the width direction of the positive electrode plate 1 and the negative electrode plate 2 is parallel to the direction perpendicular to the bending direction L. For ease of subsequent description, in this embodiment, the width direction of the positive electrode plate 1 and the negative electrode plate 2, the direction perpendicular to the bending direction L, and the winding axis direction are collectively referred to as the direction K.

Figure 7:
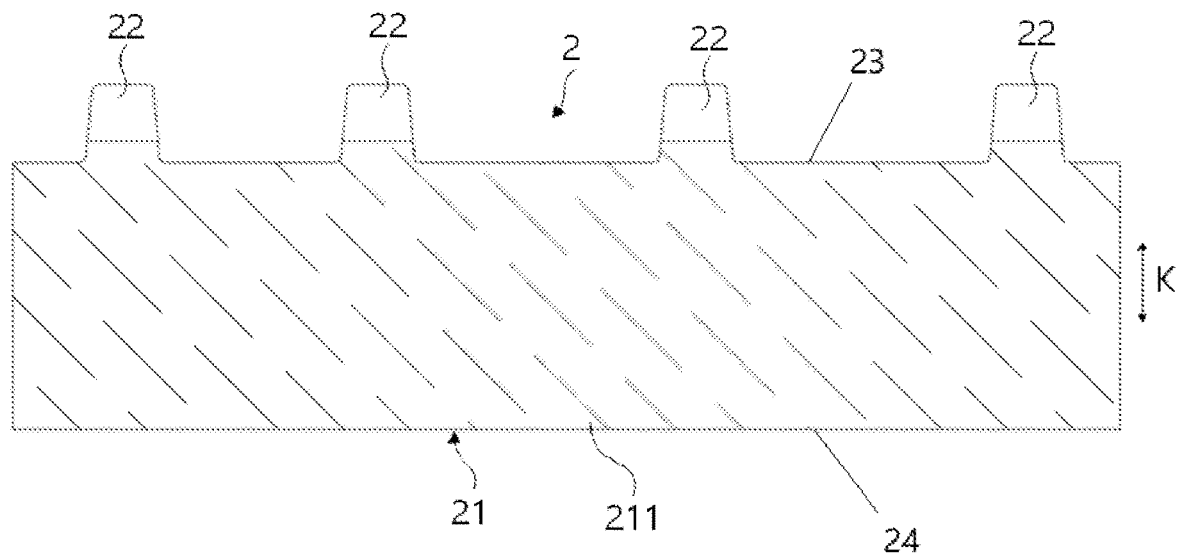
FIG. 7 is a schematic structural diagram of a negative electrode plate according to another embodiment of this application.

The structure of the negative electrode plate 2 may be shown in FIG. 7. FIG. 7 is a schematic structural diagram of a negative electrode plate according to another embodiment of this application. The negative electrode plate 2 includes a negative electrode body portion 21 and a negative electrode tab 22 extending outwards the negative electrode body portion 21 in the direction K. At least a partial region on a surface of the negative electrode body portion 21 in the direction K is a negative electrode active material region 211. The negative electrode active material region 211 is used to coat the negative active material, and the negative electrode active material may be graphite or silicon.

In another embodiment of this application, the negative electrode active material region 211 is not only provided in the partial region on the surface of the negative electrode body portion 21; the negative electrode active material region 211 is also provided on a surface of the negative electrode tab 22 and a root region near the negative electrode body portion 21, that is, a partial region of the negative electrode tab 22 is the negative electrode active material region 211.

In another embodiment of this application, as shown in FIG. 7, the negative electrode active material region 211 covers the entire surface of the negative electrode body portion 21 in the direction K.

Figure 8:
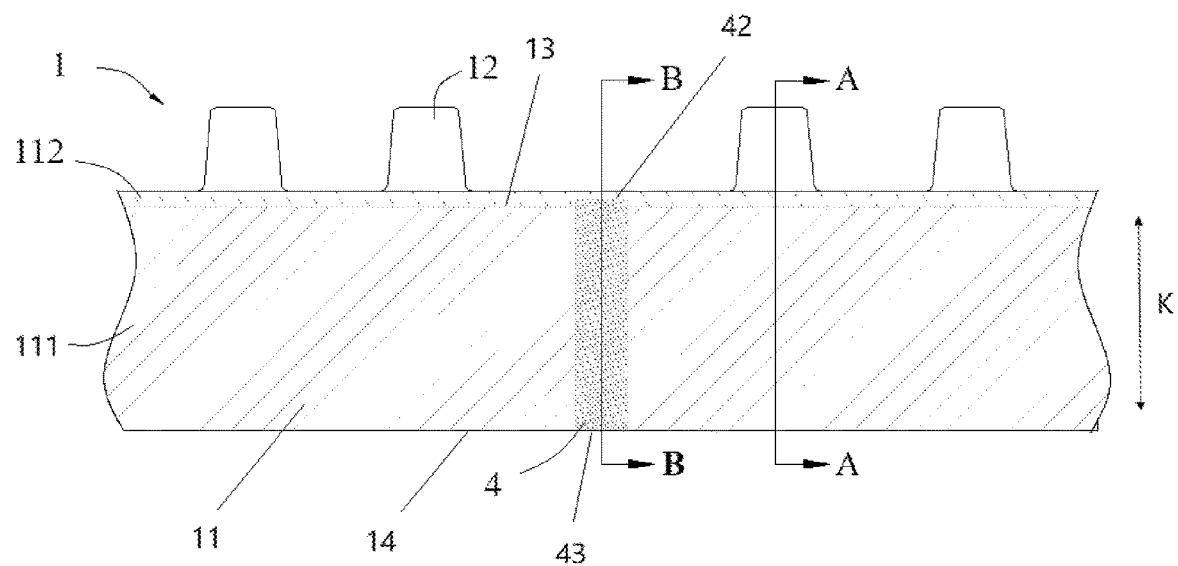
FIG. 8 is a schematic structural diagram of a positive electrode plate according to another embodiment of this application.

In another embodiment of this application, the positive electrode active material may not cover the entire surface of the positive electrode plate 1. For example, FIG. 8 is a schematic structural diagram of a positive electrode plate according to another embodiment of this application.

The positive electrode plate 1 includes a positive electrode body portion 11 and at least one positive electrode tab portion 12 extending outwards the positive electrode body portion 11 in the direction K. At least a partial region of the surface of the positive electrode body portion 11 is a positive electrode active material region 111. The positive electrode active material region 111 may be coated with a positive electrode active material, for example, the positive electrode active material may be a ternary material, lithium manganate oxide, or lithium iron phosphate.

Figure 9:
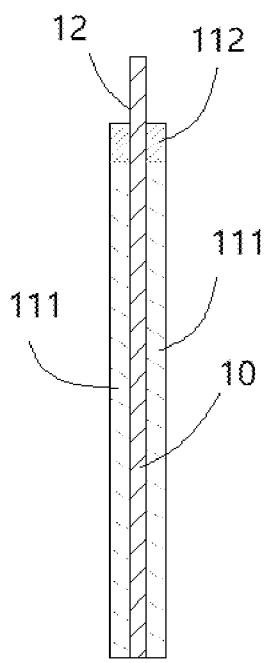
FIG. 9 is a schematic structural diagram of a cross section in a direction A-A in FIG. 8.

In another embodiment of this application, the surface of the positive electrode body portion 11 further includes a first insulation layer coated region 112 adjacent to the positive electrode active material region 111, and the first insulation layer coated region 112 is located at a side of the positive electrode active material region 111 adjacent to the positive electrode tab portion 12. The first insulation layer coated region 112 is used for coating with an insulation material, to insulate and isolate the positive active material region 111 from the positive electrode tab portion 12. For example, FIG. 9 is a schematic structural diagram of a cross section in a direction A-A in FIG. 8. The positive electrode active material region 111 is provided on two surfaces of a current collector 10 of the positive electrode plate 1, and the positive electrode tab portion 12 is a part of the current collector 10 of the positive electrode plate 1. The current collector 10 may be made of aluminum.

For example, the positive electrode active material region 111 and the first insulation layer coated region 112 are distributed at two ends, in the width direction (the direction K) of the positive electrode body portion 11, of the surface of the positive electrode body portion 11, and the positive electrode tab portion 12 and the first insulation layer coated region 112 belongs to the same end of the positive electrode body portion 11.

In another embodiment of this application, the positive electrode active material region 111 and the first insulation layer coated region 112 are two substantially parallel regions on the surface of the positive electrode body portion 11, and are distributed as two layers on the surface of the positive electrode body portion 11 in the direction K.

In another embodiment of this application, the first insulation layer coated region 112 may be located at a joint portion between the positive electrode body portion 11 and the positive electrode tab portion 12. For example, the first insulation layer coated region 112 is located on the surface of the positive electrode body portion 11 and the joint portion between the positive electrode body portion 11 and the positive electrode tab portion 12, and is used to isolate the surface of the positive electrode tab portion 12 from the positive electrode active material region 111. In another embodiment of this application, the first insulation layer coated region 112 is provided on the surface of the positive electrode body portion 11, and a second insulation layer coated region is also provided in the root region of the positive electrode tab portion 12 close to the positive electrode body portion 11. The second insulation layer coated region are used for coating of an insulation material.

In another embodiment of this application, an insulation material is coated to the surface of the first insulation layer coated region 112, and the insulation material includes an inorganic filler and a binder. The inorganic filler includes one or more of boehmite, aluminum oxide, magnesium oxide, titanium dioxide, zirconium oxide, silicon dioxide, silicon carbide, boron carbide, calcium carbonate, aluminum silicate, calcium silicate, potassium titanate, and barium sulfate. The binder includes one or more of polyvinylidene fluoride, polyacrylonitrile, polyacrylic acid, polyacrylate, polyacrylic acid-acrylate, polyacrylonitrile-acrylic acid, and polyacrylonitrile-acrylate.

In another embodiment of this application, each positive electrode plate 1 may include one, two, or more than two positive electrode tab portions 12. When the positive electrode plate 1 includes two or more positive tab portions 12, all the positive pole tab portions 12 are located on the same side of the positive electrode plate 1 in the direction K.

With reference to FIG. 7 and FIG. 8, when the positive electrode plate 1 and the negative electrode plate 2 are stacked, two ends of the negative electrode active material region 211 of the negative electrode plate 2 in the direction K extend beyond corresponding ends of the positive electrode active material region 111 of the adjacent positive electrode plate 1. This can ensure the energy density of the electrode assembly. For example, the two ends of the negative electrode active material region 211 in the direction K are a first end 23 and a second end 24, and the two ends of the positive electrode active material region 111 in the direction K are a third end 13 and a fourth end 14. The first end 23 of the negative electrode active material region 211 and the third end 13 of the positive electrode active material region 111 are located on the same side of the electrode assembly in the direction K, and the first end 23 of the negative electrode active material region 211 extends beyond the third end 13 of the positive electrode active material region 111 in the direction K. The second end 24 of the negative electrode active material region 211 and the fourth end 14 of the positive electrode active material region 111 are located on the other side of the electrode assembly in the direction K, and the second end 24 of the negative electrode active material region 211 extends beyond the fourth end 14 of the positive electrode active material region 111 in the direction K.

A size by which the two ends of the negative electrode active material region 211 extending beyond the corresponding ends of the positive electrode active material region 111 along the winding axis K may be the same or different. For example, an exceeding size ranges from 0.2 mm to 5 mm.

Figure 10:
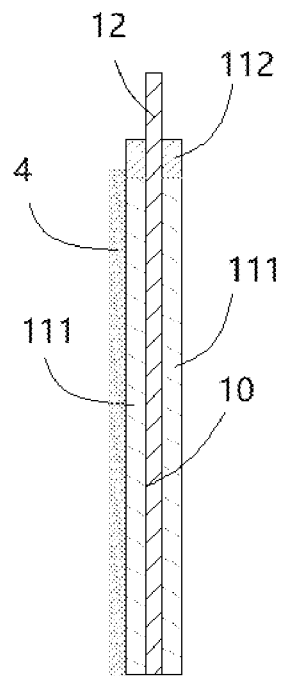
FIG. 10 is a schematic structural diagram of a cross section in a direction B-B in FIG. 8.

As shown in FIG. 10, FIG. 10 is a schematic structural diagram of a cross section in a direction B-B in FIG. 8. With reference to FIG. 8, the barrier layer 4 is attached to the surface of the positive electrode active material region 111, that is, the surface of the positive electrode active material layer.

In order to block lithium ions and reduce costs, the barrier layer 4 includes a fifth end 42 and a sixth end 43 in the direction perpendicular to the bending direction (which is the direction K), and the fifth end 42 of the barrier layer 4 extends beyond the positive electrode active material layer of the positive electrode plate 1, and/or the sixth end 43 of the barrier layer 4 exceeds beyond the positive electrode active material layer. To be specific, the fifth end 42 of the barrier layer 4 exceeds the third end 13 of the positive electrode active material region 111 in the direction K, and/or the sixth end 43 of the barrier layer 4 extends beyond the fourth end 14 of the positive electrode active material region 111 in the direction K, for example, the exceeding size ranges from 0.2 mm to 5 mm. In this way, passage of more lithium ions can be blocked, reducing lithium precipitation.

In another embodiment of this application, both the fifth end 42 and the sixth end 43 of the barrier layer 4 do not exceed the corresponding ends of the negative electrode active material layer of the negative electrode plate 2. That is, the first end 23 of the negative electrode active material region of the negative electrode plate 2 extends beyond the fifth end 42 of the barrier layer 4, and/or the second end 24 of the negative electrode active material region of the negative electrode plate 2 extends beyond the sixth end 43 of the barrier layer 4. In this way, lithium ions can be intercalated into a portion of the negative electrode plate 2 extending beyond the barrier layer 4, ensuring the energy density of the electrode assembly.

The foregoing embodiments briefly describe only a positional relationship between the barrier layer and the positive electrode plate, a positional relationship between the barrier layer and the negative electrode plate, and a structural characteristic of the barrier layer. For better understanding on the positional relationship between the barrier layer and the positive electrode plate, the positional relationship between the barrier layer and the negative electrode plate, and the structure of the barrier layer, the following describes in detail several electrode assemblies with a winding structure.

Figure 11:
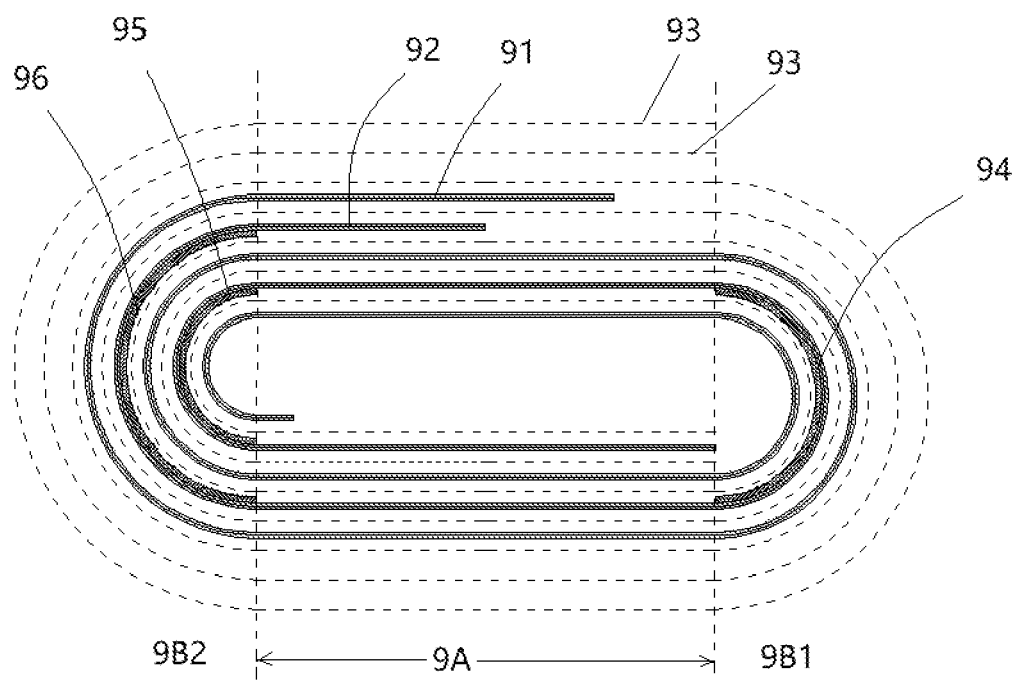
FIG. 11 is a schematic structural diagram of a cross section perpendicular to a winding axis of a flat-shaped electrode assembly according to another embodiment of this application.

As shown in FIG. 11, FIG. 11 is a schematic structural diagram of a cross section perpendicular to a winding axis of a flat-shaped electrode assembly according to another embodiment of this application. The electrode assembly includes a negative electrode plate 91, a positive electrode plate 92, a separator 93, a first barrier layer 94, a second barrier layer 95, and a third barrier layer 96. The separator 93 is located between the negative electrode plate 91 and the positive electrode plate 92, and there are two separators 93, indicated by two winding dashed lines in the cross-sectional view of the electrode assembly in FIG. 11. The negative electrode plate 91, the positive electrode plate 92, and the separator 93 are stacked and then wound into a flat-shaped winding structure around the winding axis.

For related technical features of the negative electrode plate 91, the positive electrode plate 92, and the separator 93 in this embodiment, refer to the descriptions of the embodiments corresponding to FIGS. 1 to 10. Details are not repeated herein.

In this embodiment, the winding structure of the electrode assembly includes a flat region 9A, and a first bend region 9B1 and a second bend region 9B2 that are located on two sides of the flat region 9A. Division of the flat region 9A from the first bend region 9B1 and the second bend region 9B2 is separately denoted by a straight dotted line.

The negative electrode plate 91 and the positive electrode plate 92 included in the first bend region 9B1 and the second bend region 9B2 of the electrode assembly are alternately stacked in sequence. The separator 93 is provided between the negative electrode plate 91 and the positive electrode plate 92 that are adjacent to each other. Innermost electrode plates in the first bend region 9B1 and the second bend region 9B2 are both the negative electrode plate 91. A barrier layer is provided (attached to) on inner surfaces of at least innermost positive electrode plates 92 in the first bend region 9B1 and the second bend region 9B2. For example, a barrier layer is provided (attached to) on an inner surface of each layer of positive electrode plate 92 in the first bend region 9B1 and the second bend region 9B2. In this embodiment, the inner surface of the positive electrode plate 92 is a surface of the positive electrode plate 92 facing toward the winding axis, or a surface facing toward inside of the winding structure.

For example, the first bend region 9B1 has a plurality of layers of electrode plates, such as three layers of electrode plates. An innermost-layer electrode plate (also referred to as the first layer) and an outermost-layer electrode plate (also referred to as the third layer) of the first bend region 9B1 are both the negative electrode plate 91, and an electrode plate (also referred to as the second-layer electrode plate) between the innermost-layer electrode plate and the outermost-layer electrode plate is the positive electrode plate 92. The positive electrode plate 92 is a positive electrode plate on the innermost side of the first bend region 9B1, and the first barrier layer 94 is attached to an inner surface of the positive electrode plate 92 in the first bend region 9B1.

The second bend region 9B2 has a plurality of layers of electrode plates, such as five layers of electrode plates. In a direction from inside to outside of the winding structure, the negative electrode plate 91 and the positive electrode plate 92 in the second bend region 9B2 are alternately stacked in sequence. An innermost-layer electrode plate in the second bend region 9B2 is the negative electrode plate 91, and a barrier layer is attached to an inner surface of each layer of positive electrode plate 92 in the second bend region 9B2.

For example, in the direction from inside to outside of the winding structure, the second bend region 9B2 sequentially includes the first-layer, second-layer, third-layer, fourth-layer, and fifth-layer electrode plates. The first-layer, third-layer, and fifth-layer electrode plates are the negative electrode plate 91; and the second-layer and fourth-layer electrode plates are the positive electrode plate 92. A barrier layer is attached to the inner surface of each layer of layer of positive electrode plate 92 in the second bend region 9B2. For example, the second barrier layer 95 is attached to an inner surface of the second-layer electrode plate (which is the positive electrode plate 92) in the second bend region 9B2. For example, the third barrier layer 96 is attached to an inner surface of the fourth-layer electrode plate (which is the positive electrode plate 92) in the second bend region 9B2.

In this embodiment, two ends of each of the first barrier layer 94, the second barrier layer 95, and the third barrier layer 96 in the bending direction (that is, in the winding direction) are located at the junctions between the bend region and the flat region. For example, two ends of the first barrier layer 94 in the winding direction are separately located at the junction between the first bend region 9B1 and the flat region 9A, and two ends of each of the second barrier layer 95 and the third barrier layer 96 in the winding direction are separately located at the junction between the second bend region 9B2 and the flat region 9A.

In this embodiment, for related content of functions, structures, and distribution of the first barrier layer 94, the second barrier layer 95, and the third barrier layer 96, refer to related content of the barrier layer described in the embodiments of FIGS. 1 to 10. Details are not repeated herein.

Figure 12:
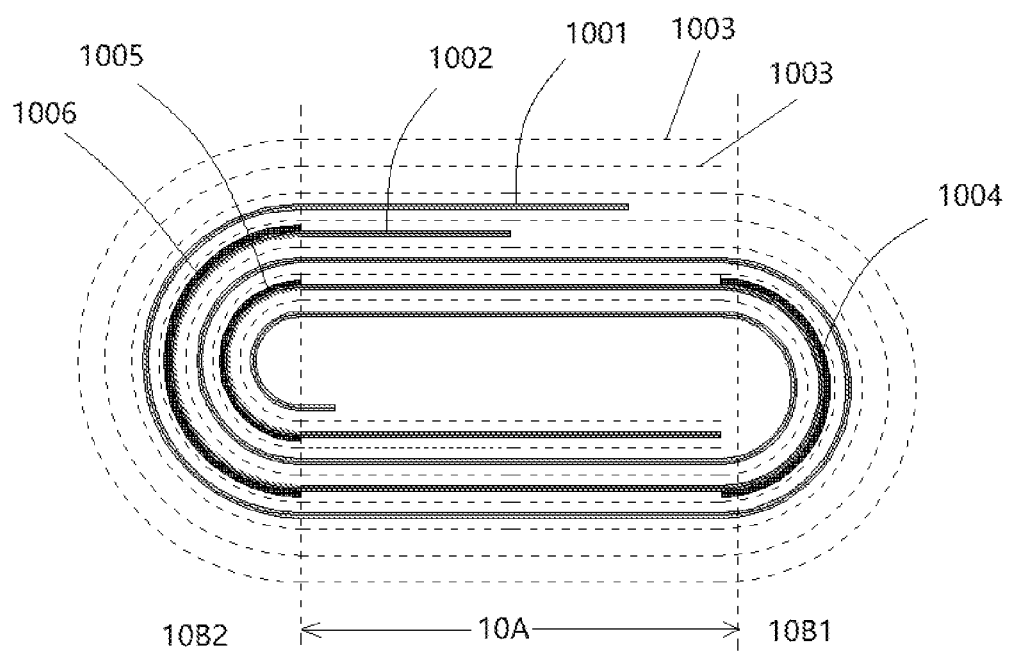
FIG. 12 is a schematic structural diagram of a cross section perpendicular to a winding axis of another flat-shaped electrode assembly according to another embodiment of this application.

As shown in FIG. 12, FIG. 12 is a schematic structural diagram of a cross section perpendicular to a winding axis of another flat-shaped electrode assembly according to another embodiment of this application. The electrode assembly includes a negative electrode plate 1001, a positive electrode plate 1002, a separator 1003, a first barrier layer 1004, a second barrier layer 1005, and a third barrier layer 1006. The separator 1003 is located between the negative electrode plate 1001 and the positive electrode plate 1002. The negative electrode plate 1001, the positive electrode plate 1002, and the separator 1003 are stacked and then wound into a flat-shaped winding structure around the winding axis.

For related technical features of the negative electrode plate 1001, the positive electrode plate 1002, and the separator 1003 in this embodiment, refer to the descriptions of the embodiments corresponding to FIGS. 1 to 10. Details are not repeated herein.

In this embodiment, the winding structure of the electrode assembly includes a flat region 10A, and a first bend region 10B1 and a second bend region 10B2 that are located on two sides of the flat region 10A.

The electrode assembly in this embodiment is basically similar to the electrode assembly described in the embodiment corresponding to FIG. 11, and the difference may be as follows:

A barrier layer is provided (attached to) on outer surfaces of at least innermost positive electrode plates 1002 in the first bend region 10B1 and the second bend region 10B2. For example, a barrier layer is provided (attached to) on an outer surface of each layer of positive electrode plate 1002 in the first bend region 10B1 and the second bend region 10B2. In this embodiment, the outer surface of the positive electrode plate 1002 is a surface of the positive electrode plate 1002 facing away from the winding axis, or a surface facing away from inside of the winding structure.

For example, the first barrier layer 1004 is attached to an outer surface of the positive electrode plate 1002 in the first bend region 10B1.

For example, the second barrier layer 1005 is attached to an outer surface of the second-layer electrode plate (which is the positive electrode plate 1002) in the second bend region 10B2. For example, a third barrier layer 1006 is attached to an outer surface of the fourth-layer electrode plate (which is the positive electrode plate 1002) in the second bend region 10B2.

In this embodiment, two ends of the first barrier layer 1004 in the winding direction are located at the junctions between the first bend region 10B1 and the flat region 10A, and two ends of each of the second barrier layer 1005 and the third barrier layer 1006 in the winding direction are located at the junctions between the second bend region 10B2 and the flat region 10A.

In this embodiment, for related content of functions, structures, and distribution of the first barrier layer 1004, the second barrier layer 1005, and the third barrier layer 1006, refer to related content of the barrier layer described in the embodiments of FIGS. 1 to 10. Details are not repeated herein.

Figure 13:
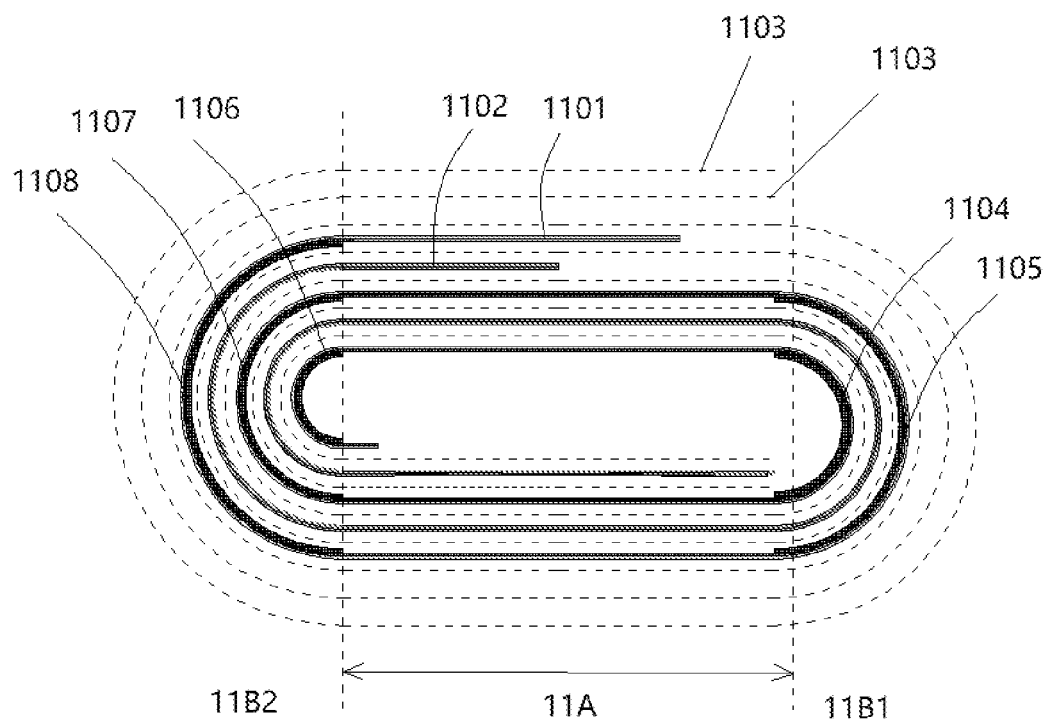
FIG. 13 is a schematic structural diagram of a cross section perpendicular to a winding axis of another flat-shaped electrode assembly according to another embodiment of this application.

As shown in FIG. 13, FIG. 13 is a schematic structural diagram of a cross section perpendicular to a winding axis of another flat-shaped electrode assembly according to another embodiment of this application. The electrode assembly includes a negative electrode plate 1101, a positive electrode plate 1102, a separator 1103, a first barrier layer 1104, a second barrier layer 1105, a third barrier layer 1106, a fourth barrier layer 1107, and a fifth barrier layer 1108. The separator 1103 is located between the negative electrode plate 1101 and the positive electrode plate 1102. The negative electrode plate 1101, the positive electrode plate 1102, and the separator 1103 are stacked and then wound into a flat-shaped winding structure around the winding axis.

For related technical features of the negative electrode plate 1101, the positive electrode plate 1102, and the separator 1103 in this embodiment, refer to the descriptions of the embodiments corresponding to FIGS. 1 to 10. Details are not repeated herein.

In this embodiment, the winding structure of the electrode assembly includes a flat region 11A, and a first bend region 11B1 and a second bend region 11B2 that are located on two sides of the flat region 11A.

The electrode assembly in this embodiment is basically similar to the electrode assembly described in the embodiment corresponding to FIG. 11, and the difference may be as follows:

A barrier layer is provided (attached to) on inner surfaces of at least innermost negative electrode plates 1101 in a first bend region 11B1 and a second bend region 11B2. For example, a barrier layer is provided on an inner surface of each layer of negative electrode plate 1101 in the first bend region 11B1 and the second bend region 11B2. In this embodiment, the inner surface of the negative electrode plate 1101 is a surface of the negative electrode plate 1101 facing toward the winding axis, or a surface facing toward inside of the winding structure.

For example, the first barrier layer 1104 is attached to an inner surface of an innermost-layer electrode plate (which is the negative electrode plate 1101) in the first bend region 11B1, and the second barrier layer 1105 is attached to an inner surface of an outermost-layer electrode plate (which is the negative electrode plate 1101).

For example, the third barrier layer 1106 is attached to an inner surface of the first-layer electrode plate (which is the negative electrode plate 1101) in the second bend region 11B2. The fourth barrier layer 1107 is attached to an inner surface of the third-layer electrode plate (which is the negative electrode plate 1101) in the second bend region 11B2. The fifth barrier layer 1108 is attached to an inner surface of the fifth-layer electrode plate (which is the negative electrode plate 1101) in the second bend region 11B2.

In this embodiment, two ends of each of the first barrier layer 1104 and the second barrier layer 1105 in the winding direction are located at the junctions between the first bend region 11B1 and the flat region 11A, and two ends of each of the third barrier layer 1106, the fourth barrier layer 1107, and the fifth barrier layer 1108 in the winding direction are located at the junctions between the second bend region 11B2 and the flat region 11A.

In this embodiment, for related content of functions, structures, and distribution of the first barrier layer 1104, the second barrier layer 1105, and the third barrier layer 1106, the fourth barrier layer 1107, and the fifth barrier layer 1108, refer to related content of the barrier layer described in the embodiments of FIGS. 1 to 10. Details are not repeated herein.

Figure 14:
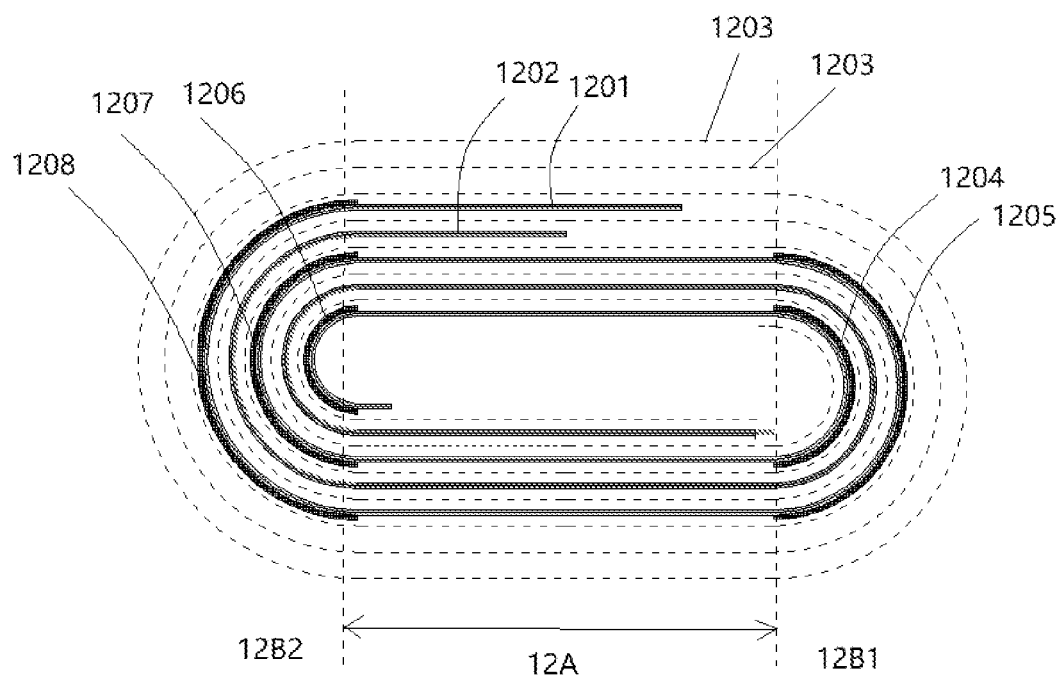
FIG. 14 is a schematic structural diagram of a cross section perpendicular to a winding axis of another flat-shaped electrode assembly according to another embodiment of this application.

As shown in FIG. 14, FIG. 14 is a schematic structural diagram of a cross section perpendicular to a winding axis of another flat-shaped electrode assembly according to another embodiment of this application. The electrode assembly includes a negative electrode plate 1201, a positive electrode plate 1202, a separator 1203, a first barrier layer 1204, a second barrier layer 1205, a third barrier layer 1206, a fourth barrier layer 1207, and a fifth barrier layer 1208. The separator 1203 is located between the negative electrode plate 1201 and the positive electrode plate 1202. The negative electrode plate 1201, the positive electrode plate 1202, and the separator 1203 are stacked and then wound into a flat-shaped winding structure around the winding axis.

For related technical features of the negative electrode plate 1201, the positive electrode plate 1202, and the separator 1203 in this embodiment, refer to the descriptions of the embodiments corresponding to FIGS. 1 to 10. Details are not repeated herein.

In this embodiment, the winding structure of the electrode assembly includes a flat region 12A, and a first bend region 12B1 and a second bend region 12B2 that are located on two sides of the flat region 12A.

The electrode assembly in this embodiment is basically similar to the electrode assembly described in the embodiment corresponding to FIG. 11, and the difference may be as follows:

A barrier layer is provided (attached to) on outer surfaces of at least innermost negative electrode plates 1201 in the first bend region 12B1 and the second bend region 12B2. For example, a barrier layer is provided on an outer surface of each layer of negative electrode plate 1201 in the first bend region 12B1 and the second bend region 12B2. In this embodiment, the outer surface of the negative electrode plate 1201 is a surface of the negative electrode plate 1201 facing away from the winding axis, or a surface facing away from inside of the winding structure.

For example, the first barrier layer 1204 is attached to an outer surface of an innermost-layer electrode plate (which is the negative electrode plate 1201) in the first bend region 12B1, and the second barrier layer 1205 is attached to an outer surface of an outermost-layer electrode plate (which is the negative electrode plate 1201).

For example, the third barrier layer 1206 is attached to an outer surface of the first-layer electrode plate (which is the negative electrode plate 1201) in the second bend region 12B2. The fourth barrier layer 1207 is attached to an outer surface of the third-layer electrode plate (which is the negative electrode plate 1201) in the second bend region 12B2. The fifth barrier layer 1208 is attached to an outer surface of the fifth-layer electrode plate (which is the negative electrode plate 1201) in the second bend region 12B2.

In this embodiment, two ends of each of the first barrier layer 1204 and the second barrier layer 1205 in the winding direction are located at the junctions between the first bend region 12B1 and the flat region 12A, and two ends of each of the third barrier layer 1206, the fourth barrier layer 1207, and the fifth barrier layer 1208 in the winding direction are located at the junctions between the second bend region 12B2 and the flat region 12A.

In this embodiment, for related content of functions, structures, and distribution of the first barrier layer 1204, the second barrier layer 1205, and the third barrier layer 1206, the fourth barrier layer 1207, and the fifth barrier layer 1208, refer to related content of the barrier layer described in the embodiments of FIGS. 1 to 10. Details are not repeated herein.

Figure 15:
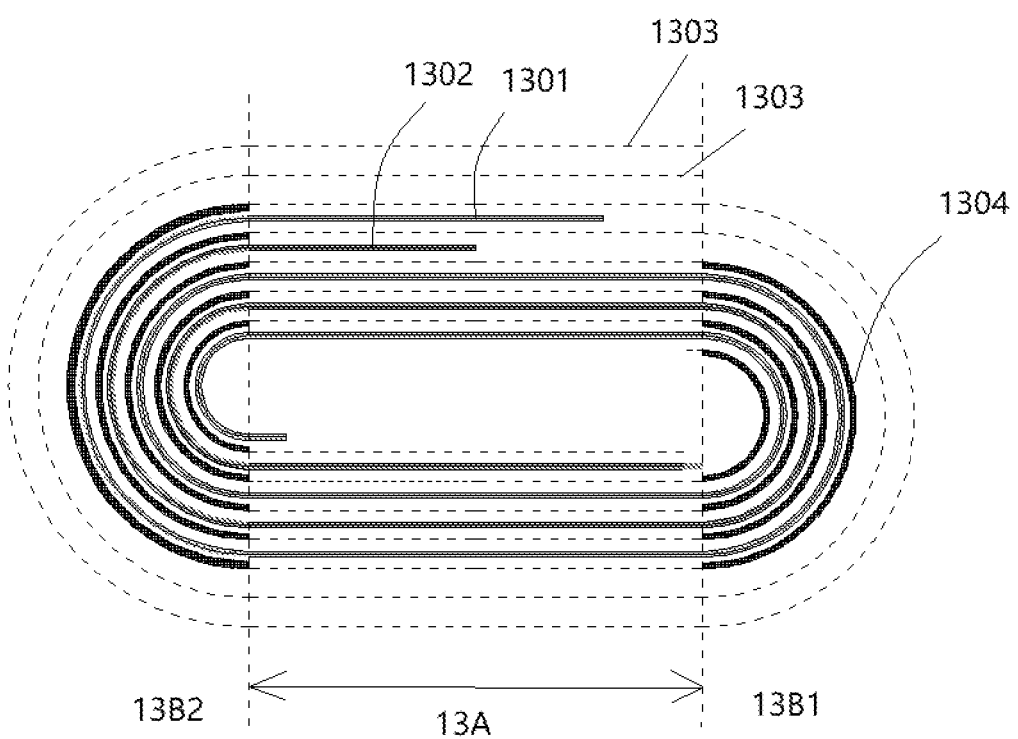
FIG. 15 is a schematic structural diagram of a cross section perpendicular to a winding axis of another flat-shaped electrode assembly according to another embodiment of this application.

As shown in FIG. 15, FIG. 15 is a schematic structural diagram of a cross section perpendicular to a winding axis of another flat-shaped electrode assembly according to another embodiment of this application. The electrode assembly includes a negative electrode plate 1301, a positive electrode plate 1302, a separator 1303, and a plurality of barrier layers 1304. The separator 1303 is located between the negative electrode plate 1301 and the positive electrode plate 1302. The negative electrode plate 1301, the positive electrode plate 1302, and the separator 1303 are stacked and then wound into a flat-shaped winding structure around the winding axis.

For related technical features of the negative electrode plate 1301, the positive electrode plate 1302, and the separator 1303 in this embodiment, refer to the descriptions of the embodiments corresponding to FIGS. 1 to 10. Details are not repeated herein.

In this embodiment, the winding structure of the electrode assembly includes a flat region 13A, and a first bend region 13B1 and a second bend region 13B2 that are located on two sides of the flat region 13A.

The electrode assembly in this embodiment is basically similar to the electrode assembly described in the embodiment corresponding to FIG. 11, and the difference may be as follows:

The barrier layer 1304 is provided on inner surfaces of at least innermost separators 1303 in the first bend region 13B1 and the second bend region 13B2. For example, the barrier layer 1304 is provided on an inner surface of each layer of separator 1303 in the first bend region 13B1 and the second bend region 13B2. In this embodiment, the inner surface of the separator 1303 is a surface of the separator 1303 facing toward the winding axis, or a surface facing toward inside of the winding structure.

In this embodiment, two ends of each barrier layer 1304 in the winding direction in the first bend region 13B1 are located at the junctions between the first bend region 13B1 and the flat region 13A, and two ends of each barrier layer 1304 in the winding direction in the second bend region 13B2 are located at the junctions between the second bend region 13B2 and the flat region 13A.

In this embodiment, for related content of functions, structures, and distribution of each barrier layer 1304, refer to related content of the barrier layer described in the embodiments of FIGS. 1 to 10. Details are not repeated herein.

Figure 16:
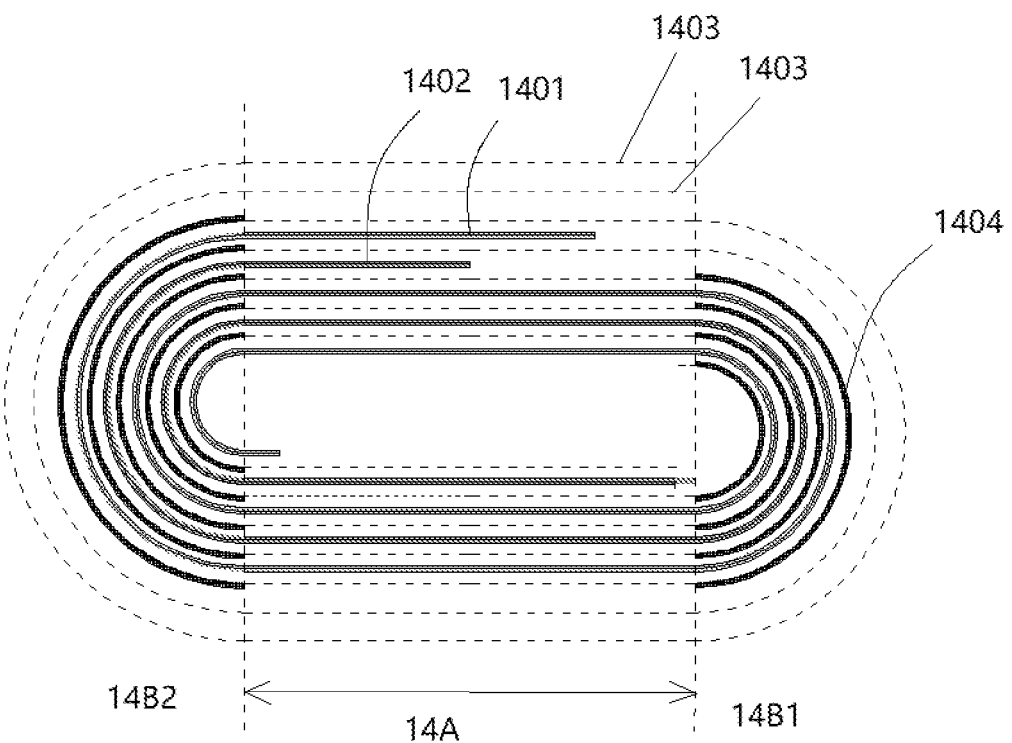
FIG. 16 is a schematic structural diagram of a cross section perpendicular to a winding axis of another flat-shaped electrode assembly according to another embodiment of this application.

As shown in FIG. 16, FIG. 16 is a schematic structural diagram of a cross section perpendicular to a winding axis of another flat-shaped electrode assembly according to another embodiment of this application. The electrode assembly includes a negative electrode plate 1401, a positive electrode plate 1402, a separator 1403, and a plurality of barrier layers 1404. The separator 1403 is located between the negative electrode plate 1401 and the positive electrode plate 1402. The negative electrode plate 1401, the positive electrode plate 1402, and the separator 1403 are stacked and then wound into a flat-shaped winding structure around the winding axis.

For related technical features of the negative electrode plate 1401, the positive electrode plate 1402, and the separator 1403 in this embodiment, refer to the descriptions of the embodiments corresponding to FIGS. 1 to 10. Details are not repeated herein.

In this embodiment, the winding structure of the electrode assembly includes a flat region 14A, and a first bend region 14B1 and a second bend region 14B2 that are located on two sides of the flat region 14A.

The electrode assembly in this embodiment is basically similar to the electrode assembly described in the embodiment corresponding to FIG. 11, and the difference may be as follows:

The barrier layer 1404 is provided on outer surfaces of at least innermost separators 1403 in the first bend region 14B1 and the second bend region 14B2. For example, the barrier layer 1404 is provided on an outer surface of each layer of separator 1403 in the first bend region 14B1 and the second bend region 14B2. In this embodiment, the outer surface of the separator 1403 is a surface of the separator 1403 facing away from the winding axis, or a surface facing away from inside of the winding structure.

In this embodiment, two ends of each barrier layer 1404 in the winding direction in the first bend region 14B1 are located at the junctions between the first bend region 14B1 and the flat region 14A, and two ends of each barrier layer 1404 in the winding direction in the second bend region 14B2 are located at the junctions between the second bend region 14B2 and the flat region 14A.

In this embodiment, for related content of functions, structures, and distribution of each barrier layer 1404, refer to related content of the barrier layer described in the embodiments of FIGS. 1 to 10. Details are not repeated herein.

Figure 17:
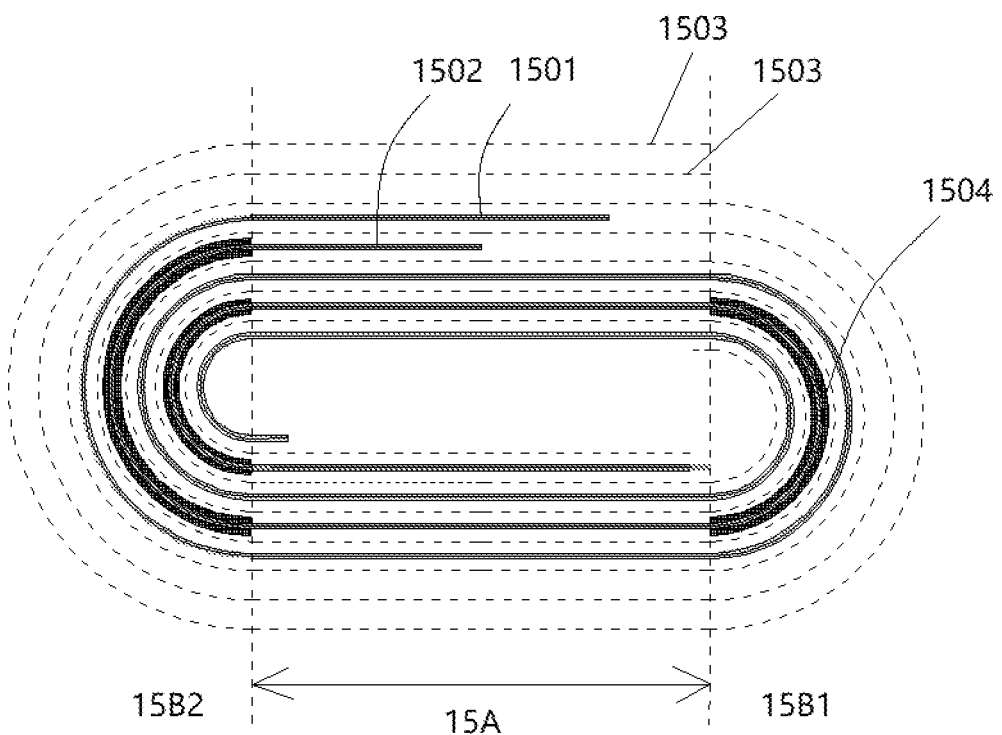
FIG. 17 is a schematic structural diagram of a cross section perpendicular to a winding axis of another flat-shaped electrode assembly according to another embodiment of this application.

As shown in FIG. 17, FIG. 17 is a schematic structural diagram of a cross section perpendicular to a winding axis of another flat-shaped electrode assembly according to another embodiment of this application. The electrode assembly includes a negative electrode plate 1501, a positive electrode plate 1502, a separator 1503, and a plurality of barrier layers 1504. The separator 1503 is located between the negative electrode plate 1501 and the positive electrode plate 1502. The negative electrode plate 1501, the positive electrode plate 1502, and the separator 1503 are stacked and then wound into a flat-shaped winding structure around the winding axis.

For related technical features of the negative electrode plate 1501, the positive electrode plate 1502, and the separator 1503 in this embodiment, refer to the descriptions of the embodiments corresponding to FIGS. 1 to 10. Details are not repeated herein.

In this embodiment, the winding structure of the electrode assembly includes a flat region 15A, and a first bend region 15B1 and a second bend region 15B2 that are located on two sides of the flat region 15A.

The negative electrode plate 1501 and the positive electrode plate 1502 that are included in the first bend region 15B1 and the second bend region 15B2 of the electrode assembly are alternately stacked in sequence, and the separator 1503 is provided between any negative electrode plate 1501 and positive electrode plate 1502 that are adjacent to each other in the first bend region 15B1 and the second bend region 15B2. Innermost electrode plates in the first bend region 15B1 and the second bend region 15B2 are all negative electrode plates 1501. The barrier layer 1504 is provided on both inner and outer surfaces of at least the innermost positive electrode plates 1502 in the first bend region 15B1 and the second bend region 15B2, for example, the barrier layer 1504 is provided on both inner and outer surfaces of each layer of positive electrode plate 1502 in the first bend region 15B1 and the second bend region 15B2. In this embodiment, the inner surface of the positive electrode plate 1502 is a surface of the positive electrode plate 1502 facing toward the winding axis, or a surface facing toward inside of the winding structure. The outer surface of the positive electrode plate 1502 is a surface of the positive electrode plate 1502 facing away from the winding axis, or a surface facing away from inside of the winding structure.

For example, the first bend region 15B1 has a plurality of layers of electrode plates, such as three layers of electrode plates. The innermost-layer (also referred to as first-layer) electrode plate and the outermost-layer (also referred to as third-layer) electrode plate in the first bend region 15B1 are both the negative electrode plate 1501. An electrode plate (also referred to as the second-layer electrode plate) between the innermost-layer electrode plate and the outermost-layer electrode plate in the first bend region 15B1 is the positive electrode plate 1502. The barrier layer 1504 is provided (attached to) on both an inner surface and an outer surface of the positive electrode plate 1502 in the first bend region 15B1.

The second bend region 15B2 has a plurality of layers of electrode plates, such as five layers of electrode plates. In a direction from inside to outside of the winding structure, the negative electrode plate 1501 and the positive electrode plate 1502 in the second bend region 15B2 are alternately stacked in sequence. An innermost-layer electrode plate in the second bend region 15B2 is the negative electrode plate 1501, and the barrier layer 1504 is provided (attached to) on both an inner surface and an outer surface of each layer of positive electrode plate 1502 in the second bend region 15B2.

For example, in the direction from inside to outside of the winding structure, the second bend region 15B2 sequentially includes the first-layer, second-layer, third-layer, fourth-layer, and fifth-layer electrode plates. The first-layer, third-layer, and fifth-layer electrode plates are the negative electrode plate 1501; and the second-layer and fourth-layer electrode plates are the positive electrode plate 1502. The barrier layer 1504 is provided on both inner surfaces and outer surfaces of the second-layer and fourth-layer electrode plates in the second bend region 15B2.

In this embodiment, two ends of each barrier layer 1504 in the bending direction (that is, in the winding direction) are located at the junctions between the bend region and the flat region. For example, two ends of each barrier layer 1504 in the first bend region 15B1 in the winding direction are located at the junctions between the first bend region 15B1 and the flat region 15A, and two ends of each barrier layer 1504 in the second bend region 15B2 in the winding direction are located at the junctions between the second bend region 15B2 and the flat region 15A.

In this embodiment, for related content of functions, structures, and distribution of each barrier layer 1504, refer to related content of the barrier layer described in the embodiments of FIGS. 1 to 10. Details are not repeated herein.

Figure 18:
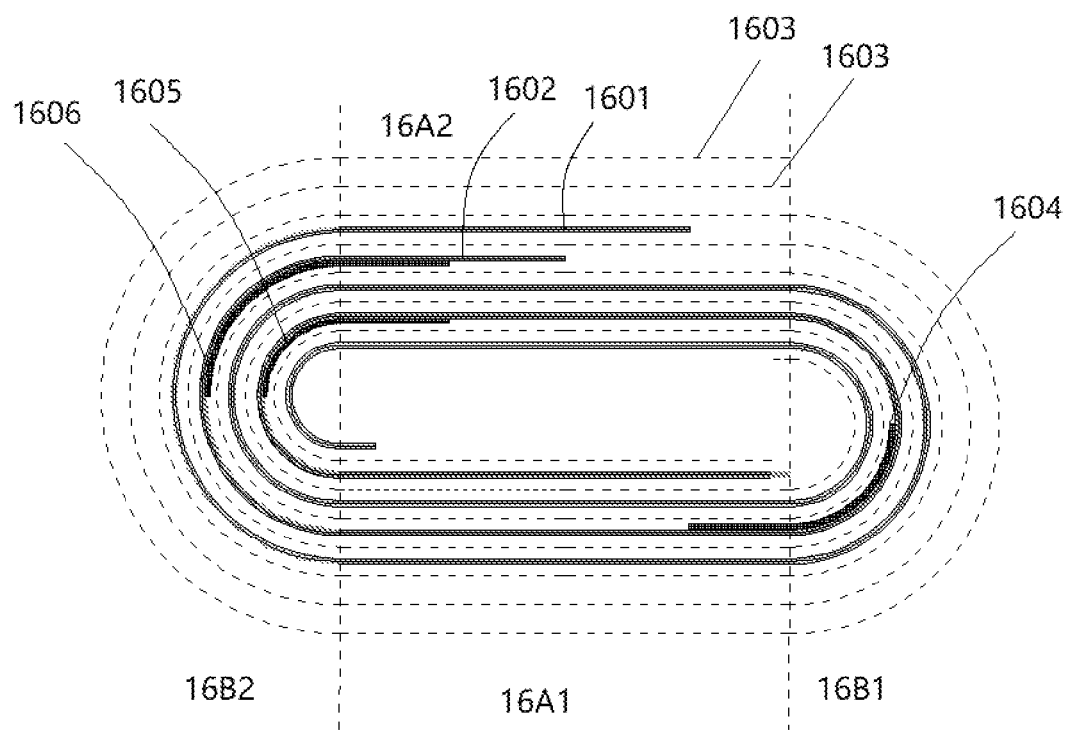
FIG. 18 is a schematic structural diagram of a cross section perpendicular to a winding axis of a flat-shaped electrode assembly according to another embodiment of this application.

As shown in FIG. 18, FIG. 18 is a schematic structural diagram of a cross section perpendicular to a winding axis of a flat-shaped electrode assembly according to another embodiment of this application. The electrode assembly includes a negative electrode plate 1601, a positive electrode plate 1602, a separator 1603, a first barrier layer 1604, a second barrier layer 1605, and a third barrier layer 1606. The separator 1603 is located between the negative electrode plate 1601 and the positive electrode plate 1602. The negative electrode plate 1601, the positive electrode plate 1602 and the separator 1603 are stacked and then wound into a flat-shaped winding structure around the winding axis.

For related technical features of the negative electrode plate 1601, the positive electrode plate 1602, and the separator 1603 in this embodiment, refer to the descriptions of the embodiments corresponding to FIGS. 1 to 10. Details are not repeated herein.

In this embodiment, the winding structure of the electrode assembly includes a first flat region 16A1, a second flat region 16A2, a first bend region 16B1, and a second bend region 16B2. The first flat region 16A1 and the second flat region 16A2 are disposed opposite each other. The first bend region 16B1 and the second bend region 16B2 are disposed opposite each other. Two ends of the first bend region 16B1 are respectively connected to ends of the first flat region 16A1 and the second flat region 16A2 on the same side. Two ends of the second bend region 16B2 are respectively connected to the other ends of the first flat region 16A1 and the second flat region 16A2 on the same side.

The negative electrode plate 1601 and the positive electrode plate 1602 included in the first bend region 16B1 and the second bend region 16B2 of the electrode assembly are alternately stacked in sequence. The separator 1603 is provided between the negative electrode plate 1601 and the positive electrode plate 1602 that are adjacent to each other. Innermost electrode plates in the first bend region 16B1 and the second bend region 16B2 are both negative electrode plates 1601. A barrier layer is provided (attached to) on inner surfaces of at least innermost positive electrode plates in the first bend region 16B1 and the second bend region 16B2. For example, a barrier layer is provided (attached to) on an inner surface of each layer of positive electrode plate 1602 in the first bend region 16B1 and the second bend region 16B2. In this embodiment, the inner surface of the positive electrode plate 1602 is a surface of the positive electrode plate 1602 facing toward the winding axis, or a surface facing toward inside of the winding structure.

For example, the first bend region 16B1 has a plurality of layers of electrode plates, such as three layers of electrode plates. The innermost-layer (also referred to as first-layer) electrode plate and the outermost-layer (also referred to as third-layer) electrode plate in the first bend region 16B1 are both the negative electrode plate 1601. An electrode plate (also referred to as the second-layer electrode plate) between the innermost-layer electrode plate and the outermost-layer electrode plate is the positive electrode plate 1602. The first barrier layer 1604 is attached to an inner surface of the positive electrode plate 1602 in the first bend region 16B1.

For example, the second bend region 16B2 has a plurality of layers of electrode plates, such as five layers of electrode plates. In a direction from inside to outside of the winding structure, the negative electrode plate 1601 and the positive electrode plate 1602 in the second bend region 16B2 are alternately stacked in sequence. An innermost-layer electrode plate in the second bend region 16B2 is the negative electrode plate 1601, and a barrier layer is attached to an inner surface of each layer of positive electrode plate 1602 in the second bend region 16B2.

For example, in the direction from inside to outside of the winding structure, the second bend region 16B2 sequentially includes the first-layer, second-layer, third-layer, fourth-layer, and fifth-layer electrode plates. The first-layer, third-layer, and fifth-layer electrode plates are the negative electrode plate 1601; and the second-layer and fourth-layer electrode plates are the positive electrode plate 1602. The second barrier layer 1605 is attached to an inner surface of the positive electrode plate 1602 in the negative electrode plate 1601 and the positive electrode plate 1602 that are adjacent to each other on the innermost side of the second bend region 16B2, that is, the second barrier layer 1605 is attached to an inner surface of the second-layer electrode plate (which is the positive electrode plate 1602) in the second bend region 16B2. For example, the third barrier layer 1606 is attached to an inner surface of the fourth-layer electrode plate (which is the positive electrode plate 1602) in the second bend region 16B2.

In this embodiment, the first barrier layer 1604 includes a first end and a second end in the bending direction (that is, in the winding direction). The first end of the first barrier layer 1604 is located in the first bend region 16B1, and the second end of the layer 1604 is located in the first flat region 16A1. The second barrier layer 1605 includes a first end and a second end in the bending direction (that is, in the winding direction). The first end of the second barrier layer 1605 is located in the second bend region 16B2, and the second end of the second barrier layer 1605 is located in the second flat region 16A2. The third barrier layer 1606 includes a first end and a second end in the bending direction (that is, in the winding direction). The first end of the third barrier layer 1606 is located in the second bend region 16B2, and the second end of the third barrier layer 1606 is located in the second flat region 16A2. In another embodiment of this application, the first end of the third barrier layer 1606 is located in the second bend region 16B2, and the second end of the third barrier layer 1606 is located in the first flat region 16A1.

In this embodiment, for related content of functions, structures, and distribution of the first barrier layer 1604, the second barrier layer 1605, and the third barrier layer 1606, refer to related content of the barrier layer described in the embodiments of FIGS. 1 to 10. Details are not repeated herein.

Figure 19:
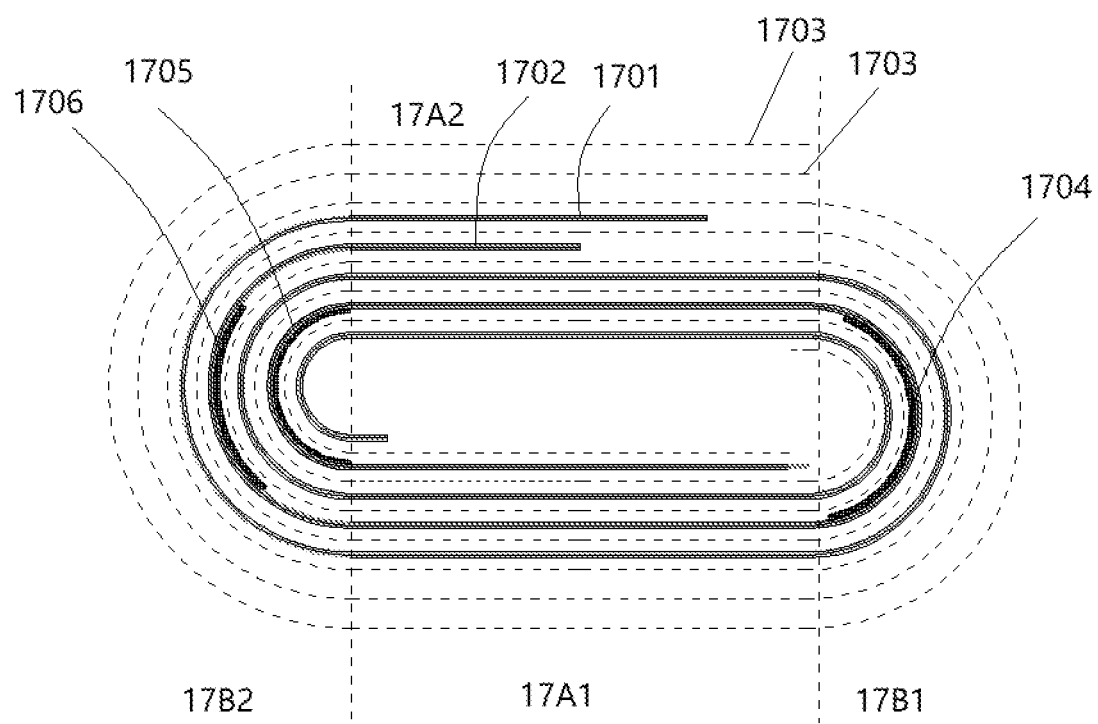
FIG. 19 is a schematic structural diagram of a cross section perpendicular to a winding axis of a flat-shaped electrode assembly according to another embodiment of this application.

As shown in FIG. 19, FIG. 19 is a schematic structural diagram of a cross section perpendicular to a winding axis of a flat-shaped electrode assembly according to another embodiment of this application. The electrode assembly includes a negative electrode plate 1701, a positive electrode plate 1702, a separator 1703, a first barrier layer 1704, a second barrier layer 1705, and a third barrier layer 1706. The separator 1703 is located between the negative electrode plate 1701 and the positive electrode plate 1702. The negative electrode plate 1701, the positive electrode plate 1702, and the separator 1703 are stacked and then wound into a flat-shaped winding structure around the winding axis.

For related technical features of the negative electrode plate 1701, the positive electrode plate 1702, and the separator 1703 in this embodiment, refer to the descriptions of the embodiments corresponding to FIGS. 1 to 10. Details are not repeated herein.

In this embodiment, the winding structure of the electrode assembly includes a first flat region 17A1, a second flat region 17A2, a first bend region 17B1, and a second bend region 17B2. The first flat region 17A1 and the second flat region 17A2 are disposed opposite each other. The first bend region 17B1 and the second bend region 17B2 are disposed opposite each other. Two ends of the first bend region 17B1 are respectively connected to ends of the first flat region 17A1 and the second flat region 17A2 on the same side. Two ends of the second bend region 17B2 are respectively connected to the other ends of the first flat region 17A1 and the second flat region 17A2 on the same side.

The negative electrode plate 1701 and the positive electrode plate 1702 included in the first bend region 17B1 and the second bend region 17B2 of the electrode assembly are alternately stacked in sequence. The separator 1703 is provided between the negative electrode plate 1701 and the positive electrode plate 1702 that are adjacent to each other. Innermost electrode plates in the first bend region 17B1 and the second bend region 17B2 are both negative electrode plates 1701. A barrier layer is provided (attached to) on inner surfaces of at least innermost positive electrode plates 1702 in the first bend region 17B1 and the second bend region 17B2. For example, a barrier layer is provided (attached to) on an inner surface of each layer of positive electrode plate 1702 in the first bend region 17B1 and the second bend region 17B2. In this embodiment, the inner surface of the positive electrode plate 1702 is a surface of the positive electrode plate 1702 facing toward the winding axis, or a surface facing toward inside of the winding structure.

For example, the first bend region 17B1 has a plurality of layers of electrode plates, such as three layers of electrode plates. The innermost-layer (also referred to as first-layer) electrode plate and the outermost-layer (also referred to as third-layer) electrode plate in the first bend region 17B1 are both the negative electrode plate 1701. An electrode plate (also referred to as the second-layer electrode plate) between the innermost-layer electrode plate and the outermost-layer electrode plate is the positive electrode plate 1702. The first barrier layer 1704 is attached to an inner surface of the positive electrode plate 1702 in the first bend region 17B1.

The second bend region 17B2 is provided with a plurality of layers of electrode plates, such as five layers of electrode plates. In a direction from inside to outside of the winding structure, the negative electrode plate 1701 and the positive electrode plate 1702 in the second bend region 17B2 are alternately stacked in sequence. An innermost-layer electrode plate in the second bend region 17B2 is the negative electrode plate 1701, and a barrier layer is attached to an inner surface of each layer of positive electrode plate 1702 in the second bend region 17B2.

For example, in the direction from inside to outside of the winding structure, the second bend region 17B2 sequentially includes the first-layer, second-layer, third-layer, fourth-layer, and fifth-layer electrode plates. The first-layer, third-layer, and fifth-layer electrode plates are the negative electrode plate 1701; and the second-layer and fourth-layer electrode plates are the positive electrode plate 1702. The second barrier layer 1705 is attached to an inner surface of the positive electrode plate 1702 in the negative electrode plate 1701 and the positive electrode plate 1702 that are adjacent to each other on the innermost side of the second bend region 17B2, that is, the second barrier layer 1705 is attached to an inner surface of the second-layer electrode plate (which is the positive electrode plate 1702) in the second bend region 17B2. For example, the third barrier layer 1706 is attached to an inner surface of the fourth-layer electrode plate (which is the positive electrode plate 1702) in the second bend region 17B2.

In this embodiment, the first barrier layer 1704 includes a first end and a second end in the bending direction (that is, in the winding direction), and the first end and the second end of the first barrier layer 1704 are both located in the first bend region 17B1. The second barrier layer 1705 includes a first end and a second end in the bending direction (that is, in the winding direction). The first end of the second barrier layer 1705 is located at a junction between the second bend region 17B2 and the first flat region 17A1, and the second end of the second barrier layer 1705 is located at a junction between the second bend region 17B2 and the second flat region 17A2. The third barrier layer 1706 includes a first end and a second end in the bending direction (that is, in the winding direction), and the first end and the second end of the third barrier layer 1706 are both located in the second bend region 17B2.

In this embodiment, in the second bend region 17B2, in a direction perpendicular to the winding axis from inside to outside of the electrode assembly, curvatures of the layers of electrode plates decrease sequentially, that is, a bending degree decreases gradually. In the direction perpendicular to the winding axis from inside to outside of the electrode assembly, circumferential angles covered by barrier layers in the second bend region 17B2 in the winding direction decrease sequentially. For example, a circumferential angle covered by the third barrier layer 1706 in the second bend region 17B2 in the winding direction is less than a circumferential angle covered by the second barrier layer 1705 in the second bend region 17B2. For example, the circumference angle covered by the third barrier layer 1706 in the second bend region 17B2 in the winding direction is 90°, and the circumferential angle covered by the second barrier layer 1705 in the second bend region 17B2 in the winding direction is 180°.

In this embodiment, for related content of functions, structures, and distribution of the first barrier layer 1704, the second barrier layer 1705, and the third barrier layer 1706, refer to related content of the barrier layer described in the embodiments of FIGS. 1 to 10. Details are not repeated herein.

Figure 20:
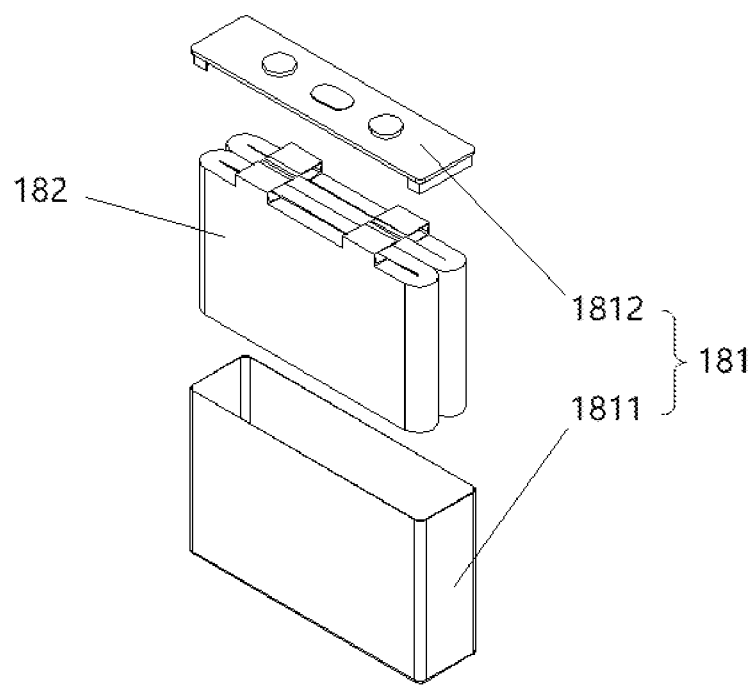
FIG. 20 is a schematic structural diagram of a battery cell according to another embodiment of this application.

As shown in FIG. 20, FIG. 20 is a schematic structural diagram of a battery cell according to another embodiment of this application. The battery cell includes an enclosure 181 and one or more electrode assemblies 182 accommodated in the enclosure 181. The enclosure 181 includes a housing 1811 and a cover plate 1812. The housing 1811 has an accommodating cavity, and the housing 1811 has an opening. That is, a housing wall is not provided on this plane, so that the inside and outside of the housing 1811 can communicate with each other and the electrode assembly 182 can be accommodated in the accommodating cavity of the housing 1811. The cover plate 1812 and the housing 1811 are combined at the opening of the housing 1811 to form a hollow chamber. After the electrode assembly 182 is accommodated in the enclosure 181, the enclosure 181 is filled with electrolyte and sealed.

The housing 1811 is determined depending on a shape obtained through combining the one or more electrode assemblies 182. For example, the housing 1811 may be a hollow cuboid, a hollow cube, or a hollow cylinder. For example, when the housing 1811 is a hollow cuboid or cube, one of faces of the housing 1811 is an open face, that is, the face has no housing wall, so that the inside and outside of the housing 1811 communicate with each other. When the housing 1811 is a hollow cylinder, one of round sides of the housing 1811 is an open face, that is, the round side has no housing wall, so that the inside and outside of the housing 1811 communicate with each other.

In another embodiment of this application, the housing 1811 may be made of a conductive metal material or plastic. Optionally, the housing 1811 may be made of aluminum or aluminum alloy.

For the structure of the electrode assembly 182, refer to related content of the electrode assembly described in the foregoing embodiments of FIGS. 1 to 19. Details are not repeated herein.

Figure 21:
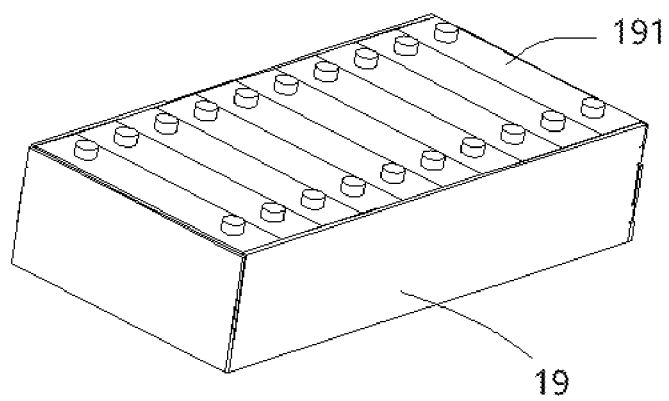
FIG. 21 is a schematic structural diagram of a battery module according to another embodiment of this application.

As shown in FIG. 21, FIG. 21 is a schematic structural diagram of a battery module according to another embodiment of this application. The battery module 19 includes a plurality of interconnected battery cells 191, and the plurality of battery cells 191 may be connected in series, in parallel, or in hybrid. Hybrid connection means being connected both in series and in parallel. For the structure of the battery cell 191, refer to the battery cell described in the embodiment corresponding to FIG. 20. Details are not repeated herein.

Figure 22:
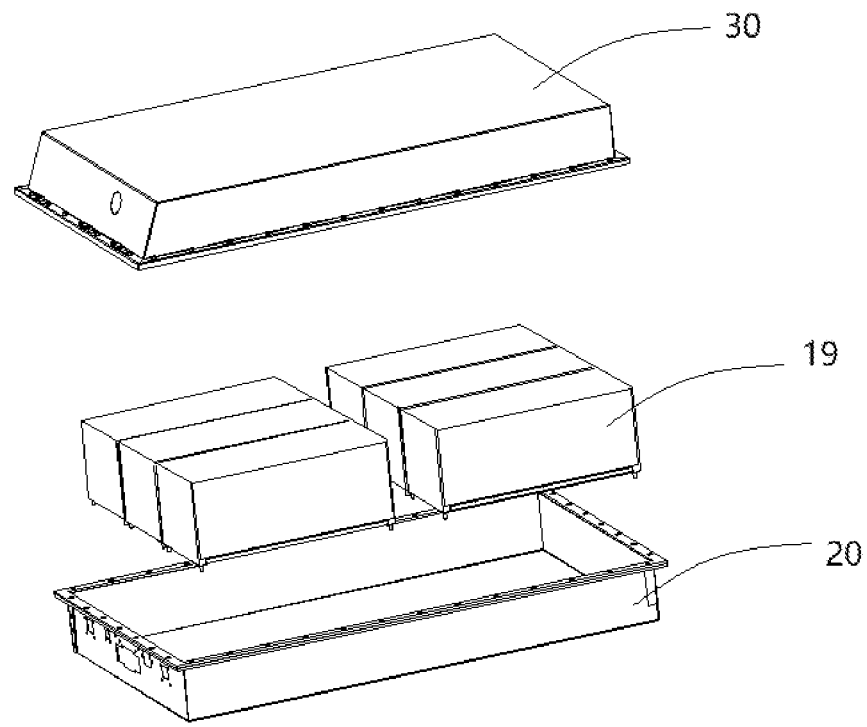
FIG. 22 is a schematic structural diagram of a battery according to another embodiment of this application.

As shown in FIG. 22, FIG. 22 is a schematic structural diagram of a battery according to another embodiment of this application. The battery includes a plurality of battery modules 19 and a box body. The box body includes a lower box body 20 and an upper box body 30. The plurality of battery modules 19 may be connected in series, in parallel, or in hybrid. The lower box body 20 has an accommodating cavity, and the lower box body 20 has an opening, so that the plurality of battery modules 19 that are connected can be accommodated in the accommodating cavity of the lower box body 20. The upper box body 30 and the lower box body 20 are combined at the opening of the lower box body 20 to form a hollow chamber, and the upper box body 30 and the lower box body 20 are seals after being combined.

In another embodiment of this application, the battery may independently supply power to the electric apparatus, for example, being used for supplying power to automobiles, and the battery may be referred to as a battery pack.

In another embodiment of this application, based on an electricity requirement of the electric apparatus, a plurality of batteries are connected and combined into a battery module to supply power to the electric apparatus. In another embodiment of this application, the battery module may alternatively be accommodated in one box body and packaged.

For ease of description, the following embodiments are described by using an example in which the electric apparatus includes a battery.

An embodiment of this application further provides an electric apparatus. For example, the electric apparatus may be an automobile, for example, a new energy vehicle. The electric apparatus includes the battery described in the foregoing embodiment. A battery used by the electric apparatus may be the battery described in the embodiment corresponding to FIG. 22. Details are not repeated herein.

Figure 23:
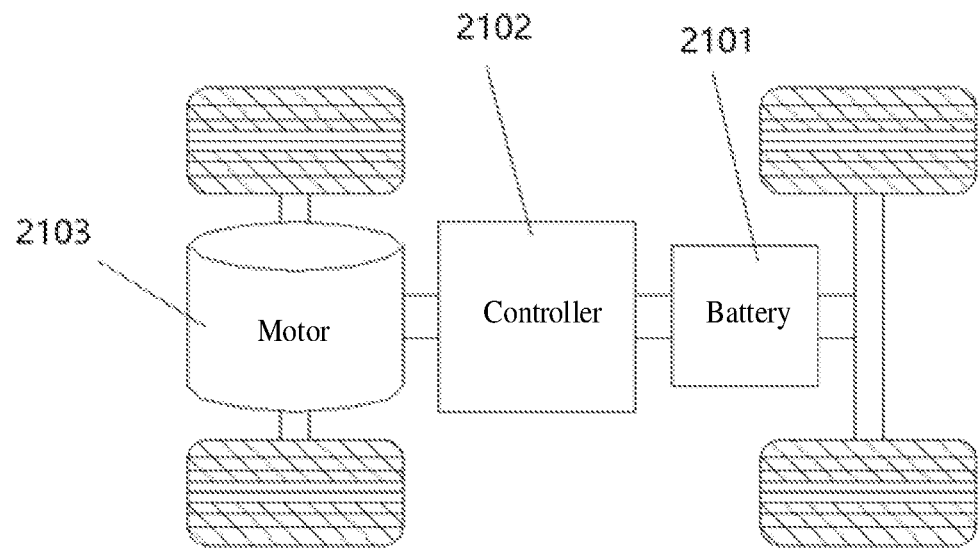
FIG. 23 is a schematic structural diagram of an electric apparatus according to another embodiment of this application.

For example, as shown in FIG. 23, FIG. 23 is a schematic structural diagram of an electric apparatus according to another embodiment of this application. The electric apparatus may be a vehicle, and the vehicle may be a fossil fuel vehicle, a natural gas vehicle, or a new energy vehicle, and the new energy vehicle may be a battery electric vehicle, a hybrid electric vehicle, an extended-range vehicle, or the like. The vehicle includes a battery 2101, a controller 2102, and a motor 2103. The battery 2101 is used to supply power to the controller 2102 and the motor 2103, and acts as an operating power source and a driving power source of the vehicle. For example, the battery 2101 is used to meet electricity requirements for startup, navigation, and driving of the vehicle. For example, the battery 2101 supplies power to the controller 2102, and the controller 2102 controls the battery 2101 to supply power to the motor 2103. The motor 2103 receives and uses the power of the battery 2101 as the driving power source of the vehicle, replacing or partially replacing fossil fuel or natural gas to provide driving power for the vehicle.

Figure 24:
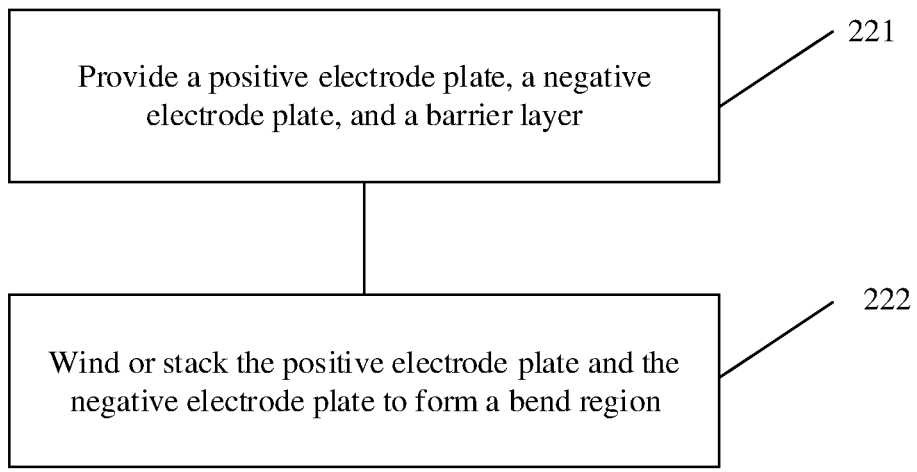
FIG. 24 is a schematic flowchart of a method for manufacturing an electrode assembly according to another embodiment of this application.

As shown in FIG. 24, FIG. 24 is a schematic flowchart of a method for manufacturing an electrode assembly according to another embodiment of this application. The method for manufacturing an electrode assembly includes the following content.

Step 221: Provide a positive electrode plate, a negative electrode plate, and a barrier layer.

Step 222: Wind or stack the positive electrode plate and the negative electrode plate to form a bend region.

The bend region is provided with a barrier layer; and at least part of the barrier layer is located between the positive electrode plate and the negative electrode plate that are adjacent to each other, and is used to prevent at least part of ions deintercalated from the positive electrode plate from being intercalated into the negative electrode plate in the bend region.

In another embodiment of this application, a separator for isolating the positive electrode plate and the negative electrode plate that are adjacent to each other is further provided; and the separator, the positive electrode plate, and the negative electrode plate are wound or stacked together.

In another embodiment of this application, before the separator, the positive electrode plate, and the negative electrode plate are wound or stacked together, the barrier layer is placed on one or two surfaces of the positive electrode plate or the negative electrode plate. For example, the barrier layer is adhered or coated to one or two surfaces of the positive electrode plate or the negative electrode plate.

For the related structure of the electrode assembly manufactured by using the manufacturing method in this embodiment, refer to related content of the electrode assembly described in the embodiments corresponding to FIGS. 1 to 19. Details are not repeated herein.

Figure 25:
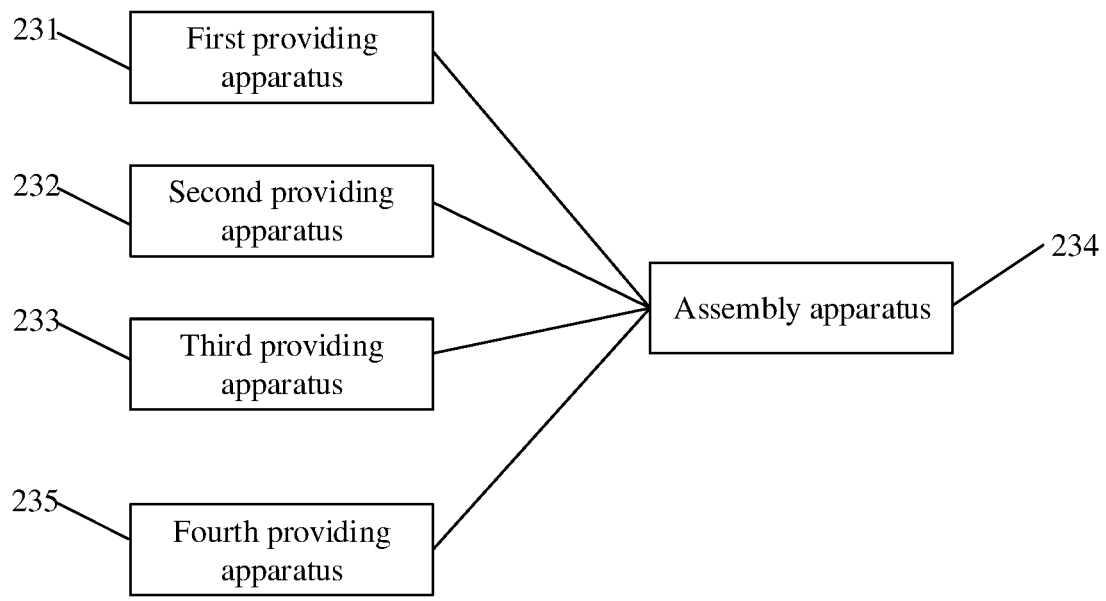
FIG. 25 is a schematic structural diagram of a device for manufacturing an electrode assembly according to another embodiment of this application.

As shown in FIG. 25, FIG. 25 is a schematic structural diagram of a device for manufacturing an electrode assembly according to another embodiment of this application. The device for manufacturing an electrode assembly includes: a first providing apparatus 231, a second providing apparatus 232, a third providing apparatus 233, and an assembly apparatus 234.

The first providing apparatus 231 is configured to provide a positive electrode plate.

The second providing apparatus 232 is configured to provide a negative electrode plate.

The third providing apparatus 233 is configured to provide a barrier layer.

The assembly apparatus 234 is configured to wind or stack the positive electrode plate and the negative electrode plate to form a bend region.

The bend region is provided with a barrier layer; and at least part of the barrier layer is located between the positive electrode plate and the negative electrode plate that are adjacent to each other, and is used to prevent at least part of ions deintercalated from the positive electrode plate from being intercalated into the negative electrode plate in the bend region.

In another embodiment of this application, the device for manufacturing an electrode assembly further includes a fourth providing apparatus 235, configured to provide a separator for isolating the positive electrode plate and the negative electrode plate that are adjacent to each other. The assembly apparatus 234 is further configured to wind or stack the positive electrode plate, the negative electrode plate, and the separator to form the bend region.

In another embodiment of this application, there are two third providing apparatuses 233, and the two third providing apparatuses 233 are configured to provide the barrier layer and adhere or coat the barrier layer onto two surfaces of the positive electrode plate or the negative electrode plate, respectively.

For the related structure of the electrode assembly manufactured by using the manufacturing device in this embodiment, refer to related content of the electrode assembly described in the embodiments corresponding to FIGS. 1 to 19. Details are not repeated herein.

To sum up, the barrier layer is provided between the positive electrode plate and the negative electrode plate that are adjacent to each other and included in the electrode assembly of the battery cell, so that the barrier layer blocks at least part of ions deintercalated from a positive electrode active material layer of the positive electrode plate in the bend region during charging, and the ions blocked by the barrier layer cannot be intercalated into a negative electrode active material layer of the negative electrode plate adjacent to the positive electrode plate in the bend region. In this way, in a case that the negative electrode active material layer of the negative electrode plate falls off, lithium precipitation is reduced, thereby improving safety performance of battery cells and improving service life of the battery cells.

Those skilled in the art can understand that, although some of the embodiments described herein include some but not other features included in other embodiments, combinations of features of different embodiments are meant to be within the scope of this application and form different embodiments. For example, in the claims, any one of the claimed embodiments may be used in any combination.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An electrode assembly comprising:
   a positive electrode plate and a negative electrode plate wound or stacked to form a bend region; and
   a barrier layer provided at the bend region, at least part of the barrier layer being located between the positive electrode plate and the negative electrode plate that are adjacent to each other, and being configured to prevent at least part of ions deintercalated from the positive electrode plate from being intercalated into the negative electrode plate in the bend region;
   wherein the barrier layer comprises two ends in a direction perpendicular to a bending direction, and one or two of the two ends of the barrier layer extend beyond a positive electrode active material layer of the positive electrode plate.

2. The electrode assembly according to claim 1, further comprising:
   a separator isolating the positive electrode plate from the negative electrode plate that are adjacent to each other;
   wherein the barrier layer is attached to at least one of:
      one or two surfaces of the positive electrode plate,
      one or two surfaces of the negative electrode plate, or
      one or two surfaces of the separator.

3. The electrode assembly according to claim 2, wherein a porosity of the barrier layer is less than a porosity of the separator.

4. The electrode assembly according to claim 1, further comprising:
   a separator isolating the positive electrode plate from the negative electrode plate that are adjacent to each other;
   wherein the barrier layer is independently provided:
      between the positive electrode plate and the separator that are adjacent to each other in the bend region, or
      between the negative electrode plate and the separator that are adjacent to each other in the bend region.

5. The electrode assembly according to claim 1, wherein:
   the positive electrode plate and the negative electrode plate are compacted and wound to form a winding structure; and
   the barrier layer is provided between the positive electrode plate and the negative electrode plate that are adjacent to each other on at least an innermost side of the bend region.

6. The electrode assembly according to claim 5, wherein an innermost electrode plate in the bend region is the negative electrode plate.

7. The electrode assembly according to claim 1, wherein the barrier layer is one of a plurality of discontinuous barrier layers spaced apart from each other in a bending direction or in a direction perpendicular to the bending direction.

8. The electrode assembly according to claim 1, wherein a thickness of the barrier layer is 2 to 200 microns.

9. The electrode assembly according to claim 1, wherein the barrier layer is provided with at least one through hole.

10. The electrode assembly according to claim 9, wherein a porosity of the barrier layer is 10% to 70%.

11. The electrode assembly according to claim 9, wherein a ratio of a thickness of the barrier layer to a porosity of the barrier layer is larger than or equal to 3.5 microns and smaller than or equal to 2000 microns.

12. The electrode assembly according to claim 1, wherein two ends, in a direction perpendicular to a bending direction, of a negative electrode active material layer of the negative electrode plate extend beyond corresponding ends of a positive electrode active material layer of the positive electrode plate.

13. The electrode assembly according to claim 1, wherein the barrier layer comprises two ends in a direction perpendicular to a bending direction, and a negative electrode active material layer of the negative electrode plate extends beyond one or two of the two ends of the barrier layer.

14. The electrode assembly according to claim 1, wherein the barrier layer is disposed opposite a largest-curvature portion of the negative electrode plate.

15. The electrode assembly according to claim 1, wherein the barrier layer comprises at least one of inorganic oxide, binder, or adhesive tape.

16. The electrode assembly according to claim 1, wherein two ends, extending in a bending direction, of the barrier layer are located in the bend region.

17. The electrode assembly according to claim 1, wherein:
   the positive electrode plate and the negative electrode plate further form a flat region connected to the bend region;
   one end, extending in a bending direction, of the barrier layer is located in the flat region; and
   another end, extending in the bending direction, of the barrier layer is located in the bend region or in the flat region.

18. A battery cell, comprising:
   a housing having an accommodating cavity and an opening;
   a cover plate configured to close the opening of the housing; and
   the electrode assembly according to claim 1 accommodated in the accommodating cavity.

19. A battery, comprising:
   a box body; and
   the battery cell according to claim 18 received in the box body.

20. The electrode assembly according to claim 1, further comprising:
   a separator isolating the positive electrode plate from the negative electrode plate that are adjacent to each other;
   wherein the barrier layer is attached to one or two surfaces of the separator.

* * * * *